US012397674B2

(12) United States Patent
Kai

(10) Patent No.: US 12,397,674 B2
(45) Date of Patent: Aug. 26, 2025

(54) INFORMATION GENERATION DEVICE, INFORMATION GENERATION METHOD, PROGRAM, AND RECORDING MEDIUM

(71) Applicant: HONDA MOTOR CO., LTD., Tokyo (JP)

(72) Inventor: Ayaka Kai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 631 days.

(21) Appl. No.: 17/442,147

(22) PCT Filed: Mar. 25, 2020

(86) PCT No.: PCT/JP2020/013310
§ 371 (c)(1),
(2) Date: Sep. 23, 2021

(87) PCT Pub. No.: WO2020/203544
PCT Pub. Date: Oct. 8, 2020

(65) Prior Publication Data
US 2022/0169144 A1 Jun. 2, 2022

(30) Foreign Application Priority Data
Mar. 29, 2019 (JP) ................. 2019-067295

(51) Int. Cl.
*H02J 7/00* (2006.01)
*B60L 53/10* (2019.01)
(Continued)

(52) U.S. Cl.
CPC ............. *B60L 53/80* (2019.02); *B60L 53/10* (2019.02); *B60L 53/53* (2019.02); *B60L 53/65* (2019.02)

(58) Field of Classification Search
None
See application file for complete search history.

(56) References Cited

U.S. PATENT DOCUMENTS 6,154,006 A  11/2000 Hatanaka et al.
8,825,354 B2  9/2014 Horita
(Continued)

FOREIGN PATENT DOCUMENTS

CN  104616516  5/2015
CN  106846073  6/2017
(Continued)

OTHER PUBLICATIONS

International Search Report and Written Opinion for International Application No. PCT/JP2020/013310 mailed on Jun. 30, 2020, 8 pages.
(Continued)

*Primary Examiner* — Arun C Williams
(74) *Attorney, Agent, or Firm* — Amin, Turocy & Watson, LLP

(57) ABSTRACT

An information generation device includes an information acquisition part configured to acquire personal information of a user who uses a battery module which is detachably attached to an electric power device that uses electric power, and an information generation part configured to generate personalized information on the basis of the personal information acquired by the information acquisition part.

27 Claims, 22 Drawing Sheets

(51) Int. Cl.
  *B60L 53/53* (2019.01)
  *B60L 53/65* (2019.01)
  *B60L 53/80* (2019.01)

(56) References Cited

U.S. PATENT DOCUMENTS

| | | | |
|---|---|---|---|
| 2009/0082957 A1* | 3/2009 | Agassi | B60L 53/65 |
| | | | 701/532 |
| 2011/0246252 A1* | 10/2011 | Uesugi | G06Q 10/10 |
| | | | 705/7.12 |
| 2014/0277844 A1 | 9/2014 | Luke | |
| 2014/0368156 A1 | 12/2014 | Aloe | |
| 2016/0283999 A1 | 9/2016 | Toya | |
| 2019/0202415 A1* | 7/2019 | Lai | G06Q 10/025 |

FOREIGN PATENT DOCUMENTS

| | | |
|---|---|---|
| CN | 106899658 | 6/2017 |
| CN | 107370824 | 11/2017 |
| CN | 107730748 | 2/2018 |
| CN | 108596713 | 9/2018 |
| JP | 2012-174107 | 9/2012 |
| JP | 2013-085449 | 5/2013 |
| JP | 2017-134451 | 8/2017 |
| JP | 2018-160074 | 10/2018 |
| JP | 2012-228074 | 11/2021 |
| KR | 10-1432028 | 9/2014 |
| WO | 2013/080211 | 6/2013 |

OTHER PUBLICATIONS

Extended European Search Report for European Patent Application No. 20785405.0 mailed Apr. 21, 2022.

European Office Action for European Patent Application No. 20785405.0 mailed Feb. 2, 2023.

Chinese Office Action for Chinese Patent Application No. 202080025251.9 mailed May 11, 2024.

* cited by examiner

| TIME STAMP | LATITUDE | LONGITUDE |
|---|---|---|
| 20180131093100 | 35° 42.67' N | 139° 47.16' E |
| 20180131093200 | 35° 43.20' N | 139° 48.36' E |
| 20180131093300 | 35° 45.10' N | 139° 50.18' E |
| ... | ... | ... |
| | | |
| | | |

| TIME STAMP | POWER CONSUMPTION AMOUNT (Wh) |
|---|---|
| 20180131093100 | 100 |
| 20180131093200 | 50 |
| 20180131093300 | 70 |
| ... | ... |
| | |
| | |

FIG. 8

| USER ID | BATTERY ID | NAME | GENDER | AGE | FAMILY STRUCTURE | JOB |
|---|---|---|---|---|---|---|
| 001 | 00123 | HANAKO YAMADA | FEMALE | 30 | FATHER, TWO CHILDREN | HOUSEWIFE |
| 002 | 00456 | TARO SHIGA | MALE | 40 | SINGLE | WORKER |
|  |  |  |  |  |  |  |
|  |  |  |  |  |  |  |

FIG. 9

| USER ID | TIME STAMP | LATITUDE | LONGITUDE |
|---|---|---|---|
| 001 | 20180131093100 | 35° 42.27' N | 139° 47.16' E |
| 001 | 20180131093200 | 35° 43.20' N | 139° 48.36' E |
| 001 | 20180131093300 | 35° 45.10' N | 139° 50.18' E |
|  | . . . | . . . | . . . |
| 002 | 20180131103100 | 35° 45.27' N | 139° 57.16' E |
| 002 | . . . | . . . | . . . |
| 002 |  |  |  |

FIG. 10

| USER ID | TIME STAMP | POWER CONSUMPTION AMOUNT (Wh) |
|---|---|---|
| 001 | 20180131093100 | 100 |
| 001 | 20180131093200 | 50 |
| 001 | 20180131093300 | 70 |
|  | . . . |  |
| 002 | 20180131103100 | 80 |
| 002 | . . . |  |
| 002 |  |  |

FIG. 11

| USER ID | TIME STAMP | ELECTRICITY CONSUMPTION (km/kWh) |
|---|---|---|
| 001 | JANUARY 31, 2019 | 13 |
| 001 | FEBRUARY 1, 2019 | 15 |
| 001 | FEBRUARY 2, 2019 | 17 |
| | . . . | |
| 002 | JANUARY 31, 2019 | 15 |
| 002 | . . . | |
| 002 | | |

FIG. 12

| RANKING | USER ID | USER ID | TIME STAMP | ELECTRICITY CONSUMPTION (km/kWh) |
|---|---|---|---|---|
| 1 | 3 | 001 | FEBRUARY 2, 2019 | 17 |
| 2 | 2 | 001 | FEBRUARY 1, 2019 | 15 |
| 3 | 5 | 002 | JANUARY 31, 2019 | 15 |
| 4 | 1 | 001 | JANUARY 31, 2019 | 13 |
| . . . | . . . | . . . | . . . | |
| | | | | |
| | | | | |

FIG. 13

| USER ID | CENTER COORDINATES | ACTION RADIUS (km) |
|---|---|---|
| 001 | 35° 42.67' N 139° 47.16' E | 15 |
| 002 | 35° 52.37' N 139° 37.26' E | 10 |
| | | |
| | | |

FIG. 28

| USER ID | M FASTFOOD STORE COFFEE S FREE COUPON | E GASOLINE STAND GASOLINE PRICE 2YEN DISCOUNT COUPON | A SUPERMARKET ICECREAM 200YEN DISCOUNT |
|---|---|---|---|
| 001 | NOT-PURCHASED | NOT-PURCHASED | PURCHASED |
| 002 | PURCHASED | NOT-PURCHASED | NOT-PURCHASED |
| 003 | NOT-PURCHASED | PURCHASED | NOT-PURCHASED |
| ... | ... | ... | ... |

INFORMATION GENERATION DEVICE, INFORMATION GENERATION METHOD, PROGRAM, AND RECORDING MEDIUM

TECHNICAL FIELD

The present invention relates to an information generation device, an information generation method, a program, and a recording medium.

Priority is claimed on Japanese Patent Application No. 2019-067295, filed Mar. 29, 2019, the content of which is incorporated herein by reference.

BACKGROUND ART

In recent years, the development of electrically driven vehicles that travel using an electric motor driven by electric power supplied from a battery (a cell) such as an electric vehicle (EV), a hybrid electric vehicle (HEV), or the like, has been in progress. In a moving body such as an electrically driven vehicle or the like, when electric power of a battery that is a driving source is exhausted, it is necessary to charge the battery in order to continue traveling thereafter. As a method of charging the battery, a battery sharing service in which a detachable battery is shared by a plurality of users has been proposed. In the battery sharing service, a user removes the exhausted detachable battery from a moving body and returns the battery to a charging station, and receives a rented charged detachable battery from the charging station and attaches the battery to the moving body.

In a vehicle control system, a cell pack-mounted memory in which information showing a state of a secondary battery is stored is provided on a cell pack, a power management ECU reads information from the cell pack-mounted memory when traveling is started, and the secondary battery is controlled on the basis of the information (for example, Patent Literature 1).

CITATION LIST

Patent Literature

[Patent Literature 1]
 Japanese Unexamined Patent Application, First Publication No. 2012-228074

SUMMARY OF INVENTION

Technical Problem

The vehicle control system disclosed in Patent Literature 1 only controls the secondary battery on the basis of the cell pack-mounted memory that stores information showing a state of the secondary battery, and does not consider providing any information to a user on the basis of data collected from the battery.

An aspect of the present invention is directed to providing an information generation device, an information generation method, a program, and a recording medium that are capable of generating more appropriate information.

Solution to Problem

An information generation device according to an aspect of the present invention includes an information acquisition part configured to acquire personal information of a user who uses a battery module detachably attached to an electric power device that uses electric power, and an information generation part configured to generate personalized information on the basis of the personal information acquired by the information acquisition part.

Advantageous Effects of Invention

According to the aspect of the present invention, more appropriate information is generated.

BRIEF DESCRIPTION OF DRAWINGS

FIG. 8 is a view showing an example of contents of a user information table.

FIG. 9 is a view showing an example of contents of accumulated traveling history information.

FIG. 10 is a view showing an example of contents of accumulated electric power consumption history information.

FIG. 11 is a view showing an example of contents of statistical electricity consumption information.

FIG. 12 is a view showing an example of contents of electricity consumption ranking information.

FIG. 13 is a view showing an example of contents of activity range information.

FIG. 28 is a view showing an example of contents of action history information.

DESCRIPTION OF EMBODIMENTS

Hereinafter, embodiments of a charging device, a service system, a method, and a program of the present invention will be described with reference to the accompanying drawings. In the following description, components having the same or similar functions are designated by the same reference signs. Then, overlapping description of these components may be omitted.

First Embodiment

[Entire Configuration]

Figure 1:
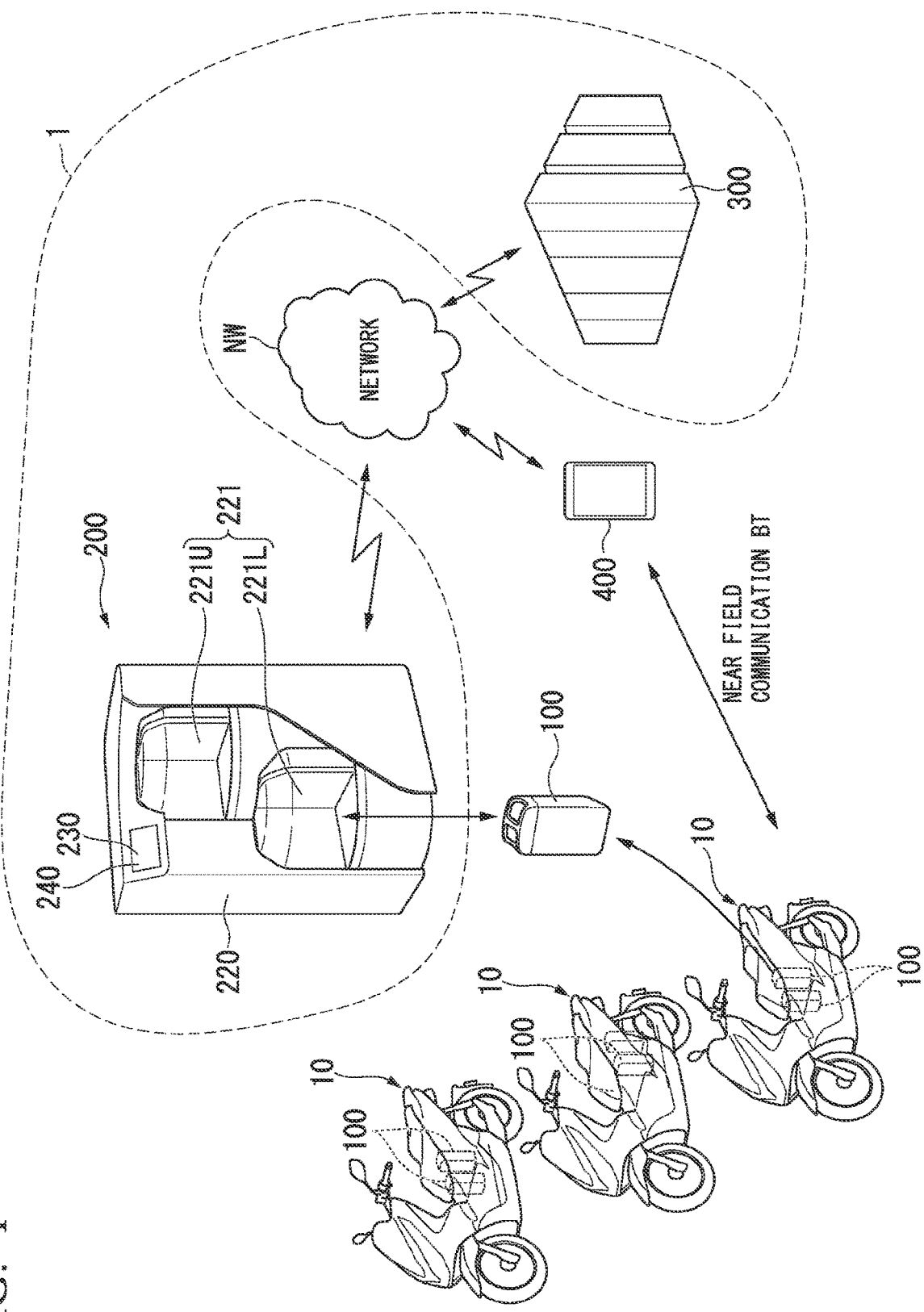
FIG. 1 is a configuration view showing an example of a service system constituted by a charging station device and a management server according to a first embodiment as a whole.

FIG. 1 is a configuration view showing an example of a service system 1 according to an embodiment as a whole. The service system (a battery sharing service system) 1 includes, for example, charging station devices 200 and a management server 300. The charging station device 200 is an apparatus configured to perform charging of the detachable battery 100 in a battery sharing service in which a detachable battery (a battery, a battery module, an electrical storage device, a capacitor) 100 that is a driving source of an electrically driven vehicle 10 is shared by a plurality of users. FIG. 1 also shows the electrically driven vehicle 10, the detachable battery 100, and a mobile information terminal 400 that use the battery sharing service. While only one charging station device 200 is shown in FIG. 1, the service system 1 includes the plurality of charging station devices 200. The detachable battery 100, the charging station devices 200, the management server 300, and the mobile information terminal 400 are able to communicate with each other via a network NW. The network NW includes, for example, the Internet, a cellular network, a Wi-Fi network, a wide area network (WAN), a local area network (LAN), and the like. The service system 1 is not limited to an electrically driven vehicle and may be applied to an appropriate device using a battery, for example, a charging/discharging device or the like. The electrically driven vehicle 10 is an example of "an electric power device" or "a moving body" and the charging station device 200 is an example of "a storage device." "The electric power device" or "the moving body" is not limited to a motorcycle and may be, for example, a vehicle that can travel using electric power and to which a detachable battery 120 is attached (one-wheeled, three-wheeled, four-wheeled, or the like), an assist-type bicycle, or the like. Instead of these vehicle type moving bodies, "the electric power device" or "the moving body" may be a portable charging/feeding device carried by a person or a vehicle as disclosed in Japanese Unexamined Patent Application, First Publication No. 2019-068552. "The electric power device" or "the moving body" may be a mobile robot, an autonomous traveling device, an electric bicycle, an autonomous traveling vehicle, another electrically driven vehicle, a drone flying object, or another electric moving device (an electric mobility).

[Electrically Driven Vehicle 10]

Figure 2:
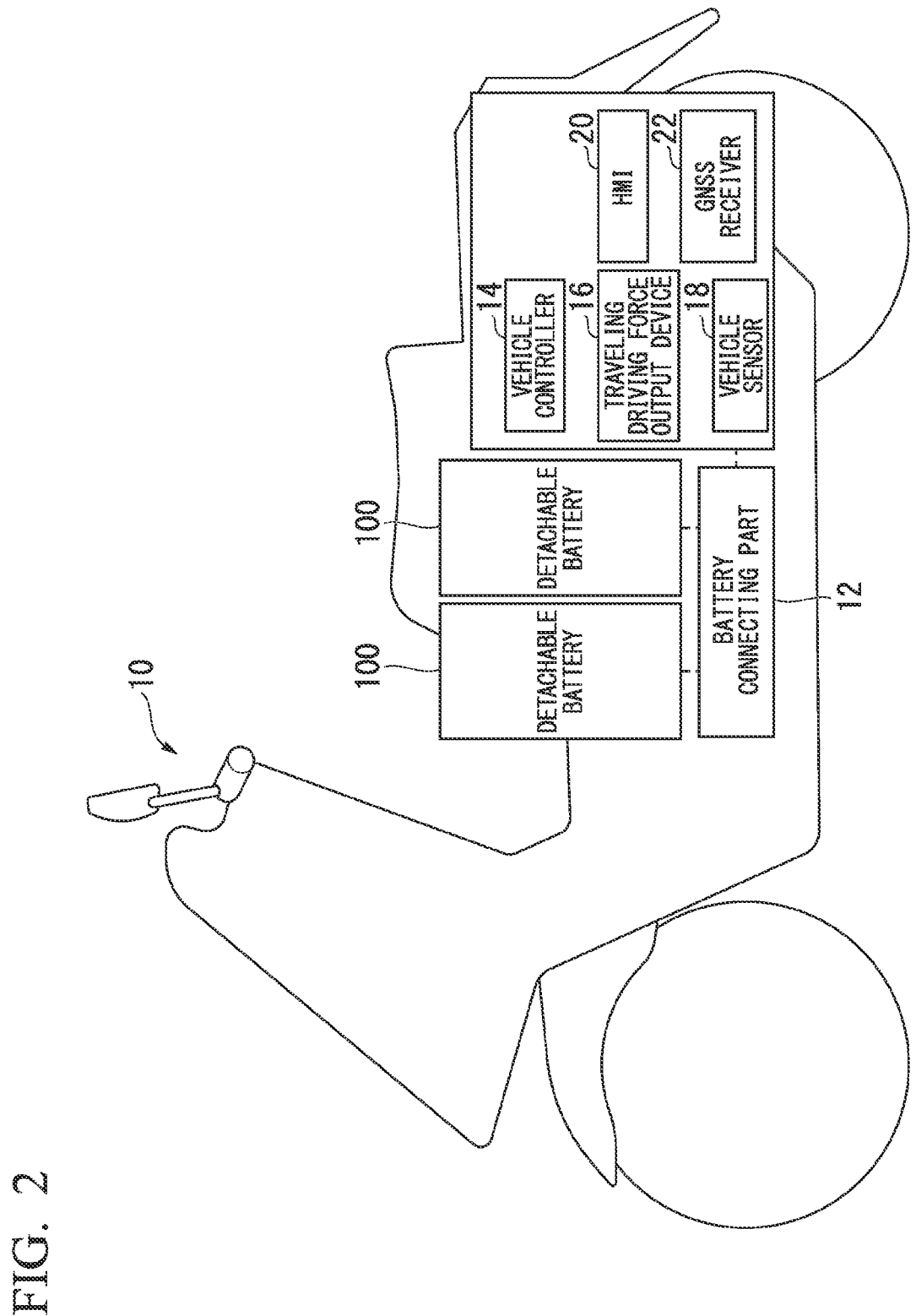
FIG. 2 is a configuration view showing an example of a configuration of an electrically driven vehicle.

FIG. 2 is a configuration view showing an example of a configuration of the electrically driven vehicle 10. The electrically driven vehicle 10 is a vehicle to and from which the detachable battery 100 is attachable and detachable, and a saddle riding vehicle that travels using a driving force of an electric motor driven by electric power supplied from an electricity accumulation part 120 of the detachable battery 100. In the embodiment, the saddle riding vehicle is a motorcycle. The electrically driven vehicle 10 is not limited to a saddle riding vehicle. The electrically driven vehicle 10 may be, for example, a vehicle such as an electric bicycle, an electric tricycle, an electric four-wheeled vehicle, or the like, an electric kick skater, a robot, or the like.

In the embodiment, the electrically driven vehicle 10 is a motorcycle to which two detachable batteries 100 are attachable. The number of detachable batteries 100 that are attachable to the electrically driven vehicle 10 may be one or three or more. The electrically driven vehicle 10 may be a vehicle including a secondary battery that supplies electric power for traveling. The electrically driven vehicle 10 may be a hybrid electrically driven vehicle that travels through combined driving of, for example, the detachable battery 100 and an internal combustion engine such as a diesel engine, a gasoline engine, or the like.

As shown in FIG. 2, the electrically driven vehicle 10 includes, for example, a battery connecting section 12, a vehicle controller 14, a traveling driving force output device 16, a vehicle sensor 18, an HMI 20, and an electrically driven vehicle GNSS receiving part 22.

The battery connecting section 12 is electrically connected to a connecting section 150 of the detachable battery 100, which will be described below, when the detachable battery 100 is attached to the electrically driven vehicle 10. The battery connecting section 12 includes, for example, a connecting terminal (a battery terminal) of an electric power line configured to receive electric power from the detachable battery 100, a connecting terminal of a communication line configured to perform data communication (for example, serial communication) between the detachable battery 100 and the vehicle controller 14, or the like.

The vehicle controller 14 receives a sensor measurement result from the vehicle sensor 18, which will be described below, receives a value (state of charge (SOC)) representing a charged state of the electricity accumulation part 120 from a battery management unit (BMU) 110 of the detachable battery 100, and receives a position of the electrically driven vehicle 10 acquired from the electrically driven vehicle GNSS receiving part 22. The vehicle controller 14 performs predetermined processing on the basis of the received data, controls the traveling driving force output device 16 according to necessity, and performs notification to a user 5 through the HMI 20. In addition, positional information (an example of personal positional information (personal information)) of the electrically driven vehicle 10 acquired from the electrically driven vehicle GNSS receiving part 22 is transmitted to the detachable battery 100 via the battery connecting section 12.

The traveling driving force output device 16 includes, for example, an electric motor, an inverter, and an electronic control unit (ECU) configured to control the inverter. The ECU controls, for example, electric power supplied to the electric motor from the detachable battery 100 by controlling the inverter. Accordingly, the ECU controls a driving force (torque) output to a driving wheel by the electric motor. The electrically driven vehicle 10 travels using a driving force of the electric motor controlled by the ECU. In addition, the traveling driving force output device 16 can operate the electric motor as a regenerative brake, convert braking energy of the driving wheels into electric energy and charge the detachable battery 100 by controlling an output frequency of the inverter such that it is lower than a rotational speed of the driving wheels.

The vehicle sensor 18 includes a speed sensor, an acceleration sensor, a rotation speed sensor, an odometer, and other various sensors, which are mounted on the electrically driven vehicle 10. The vehicle sensor 18 provides the measurement data, which were measured, to the vehicle controller 14.

The HMI 20 receives an input operation of an occupant while various types of information are output to the user 5 of the electrically driven vehicle 10. The HMI 20 includes, for example, various types of display devices such as an HUD, a meter display part, and the like, and a speaker. In addition, the HMI 20 may include a light emitting part, a buzzer, a microphone, various types of operation switches, a key, and the like. In addition, the HMI 20 may include an operation part or the like configured to perform various types of operations.

The electrically driven vehicle GNSS receiving part 22 positions, for example, a location of the electrically driven vehicle 10 on the basis of radio waves coming from global navigation satellite system (GNSS) satellites such as a GPS satellite. The electrically driven vehicle GNSS receiving part 22 outputs the location of the positioned electrically driven vehicle 10 to the BMU 110 as positioning information (an example of personal positional information (personal information)) via the battery connecting section 12.

[Detachable Battery 100]

Figures 3, 4, 5:
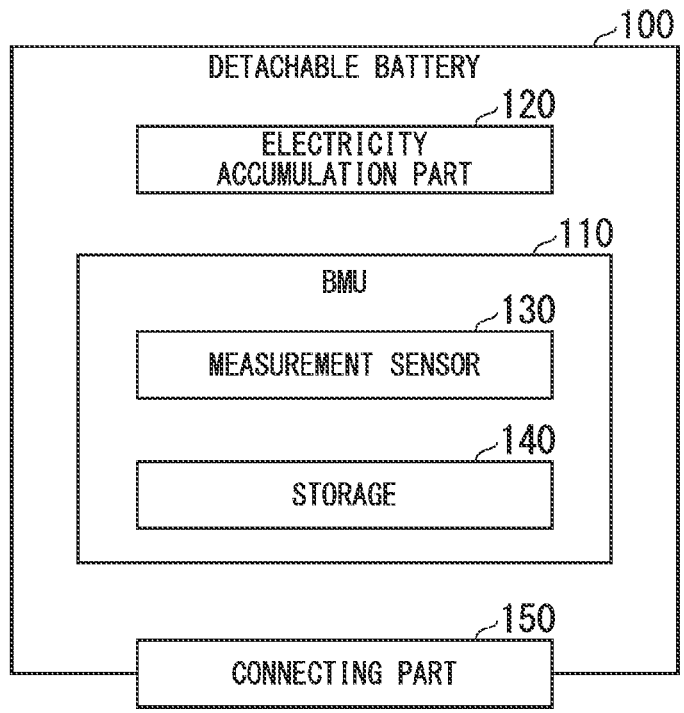
FIG. 3 is a block diagram showing an example of a configuration of a detachable battery according to the embodiment.
FIG. 4 is an example of contents of traveling history information.
FIG. 5 is an example of contents of electric power consumption history information.

FIG. 3 is a block diagram showing an example of a configuration of the detachable battery 100 according to the embodiment. As shown in FIG. 3, the detachable battery 100 includes the electricity accumulation part 120, the BMU 110 (battery management unit), and the connecting section 150. In addition, the BMU 110 includes a measurement sensor 130 and a storage 140.

The electricity accumulation part 120 is an assembled cell configured by connecting a plurality of single cells in series. Each of the single cells that constitute the electricity accumulation part 120 may be, for example, a secondary battery such as a lead storage battery, a nickel hydride battery, a lithium ion battery, or the like, a capacitor such as an electric dual layer capacitor or the like, a compound battery obtained by combining a secondary battery and a capacitor, or the like.

The BMU 110 performs, for example, control of charging or discharging of the electricity accumulation part 120, cell balancing, malfunction detection for the electricity accumulation part 120, derivation of a charging/discharging current of the electricity accumulation part 120, and estimation of the SOC of the electricity accumulation part 120. The BMU 110 is realized by executing, for example, a program (software) using a hardware processor such as a CPU or the like. In addition, some or all of the functions may be realized by hardware such as an LSI, an ASIC, an FPGA, a GPU, or the like, or may be realized by cooperation of software and hardware.

FIG. 4 is an example of contents of traveling history information. The BMU 110 accumulatively stores positioning information acquired from the electrically driven vehicle 10 via the connecting section 150 in the storage 140 as traveling history information as shown in association with a time stamp representing the current date and time. The traveling history information (an example of personal positional information (personal information)) includes positional information (an example of personal positional information (personal information)) of the electrically driven vehicle 10 from rental of the detachable battery 100 until returning of the detachable battery 100 while the detachable battery 100 is attached to the electrically driven vehicle 10. The BMU 110 may add the positional information to the traveling history information at an arbitrary time interval, or may add the positional information to the traveling history information at a timing when a speed or a course of the vehicle has greatly changed. The traveling history information is an example of the movement history information. The movement history information may include history information of a vehicle type moving body, and history information of a non-vehicle type moving body. In an example, attachment counterpart information that is at least one of information related to the electrically driven vehicle 10 to which the battery 100 currently used by a user is attached and information related to the electrically driven vehicle 10 to which the battery 100 used by a user in the past was attached is acquired as personal information.

FIG. 5 is an example of contents of electric power consumption history information (an example of personal information). The BMU 110 performs predetermined calculation and derives an electric power consumption amount (Wh) on the basis of a voltage, a current, or the like, measured by the measurement sensor 130. The predetermined calculation is performed to derive, for example, an electric energy (an electric power consumption amount of the electrically driven vehicle 10) discharged from the electricity accumulation part 120 during a predetermined time by time-integrating the electric power calculated from the voltage and the current measured by the measurement sensor 130. The BMU 110 stores the derived electric power consumption amount in the storage 140 in association with a time stamp representing a date and time at this time. In addition, the BMU 110 performs predetermined processing and derives the SOC of the electricity accumulation part 120 on the basis of the voltage, the current, and the like, measured by the measurement sensor 130. While not shown, the electric power consumption history information may include the SOC in association with the time stamp indicating the date and time at this time. Derivation of the SOC can be performed by using, for example, a method of estimating the SOC using an integrated value of an initial SOC and electric energy, a method of estimating the SOC from a terminal voltage, or the like.

In addition, the BMU 110 stores abnormalities, malfunctions, or the like, of the electricity accumulation part 120 ascertained on the basis of the measurement sensor 130 in the storage 140 as battery state information (an example of personal information).

The measurement sensor 130 is configured to include various types of sensors such as a voltage sensor, a current sensor, a temperature sensor, or the like, configured to measure a charged state of the electricity accumulation part 120. For example, the voltage sensor may measure a terminal voltage of each of the single cells that constitute the electricity accumulation part 120, or a terminal voltage of an assembled cell configured by connecting the plurality of single cells that constitute the electricity accumulation part 120 in series. For example, the current sensor measures a discharging current discharged from the electricity accumulation part 120. In addition, the current sensor measures, for example, a charging current that charges the electricity accumulation part 120 through power generation of the electric motor upon an operation of the regenerative brake. For example, the temperature sensor measures a temperature during charging or discharging of the electricity accumulation part 120. The measurement sensor 130 outputs the voltage, the current, the temperature, and the like, which were measured, to the BMU 110.

The storage 140 includes a non-volatile storage device such as a flash memory or the like. The storage 140 stores battery information (an example of personal information). The battery information includes a battery ID assigned to the detachable battery 100. The battery ID is a serial number uniquely given to identify, for example, the detachable battery 100. The battery ID is an example of the identification information. The battery information (an example of personal information) may include at least one of positioning information, traveling history information, an electric power consumption amount, electric power consumption history information, a battery SOC, battery state information, and the like, in addition to the battery ID.

The connecting section 150 is electrically connected to the battery connecting section 12 and supplies electric power accumulated in the electricity accumulation part 120 to the electric motor that is a driving source of the electrically driven vehicle 10 when the detachable battery 100 is attached to the electrically driven vehicle 10. In addition, the connecting section 150 is electrically connected to the charging station devices 200 and receives electric power from the charging station devices 200 to charge the electricity accumulation part 120 when the detachable battery 100 is accommodated in a slot section 221 (see FIG. 1) of the charging station device 200. The connecting section 150 includes, for example, a connecting terminal (a battery terminal) of an electric power line, a connecting terminal of a communication line, or the like, to correspond to the battery connecting section 12 and a charging station connecting section 224.

[Charging Station Device 200]

Figure 6:
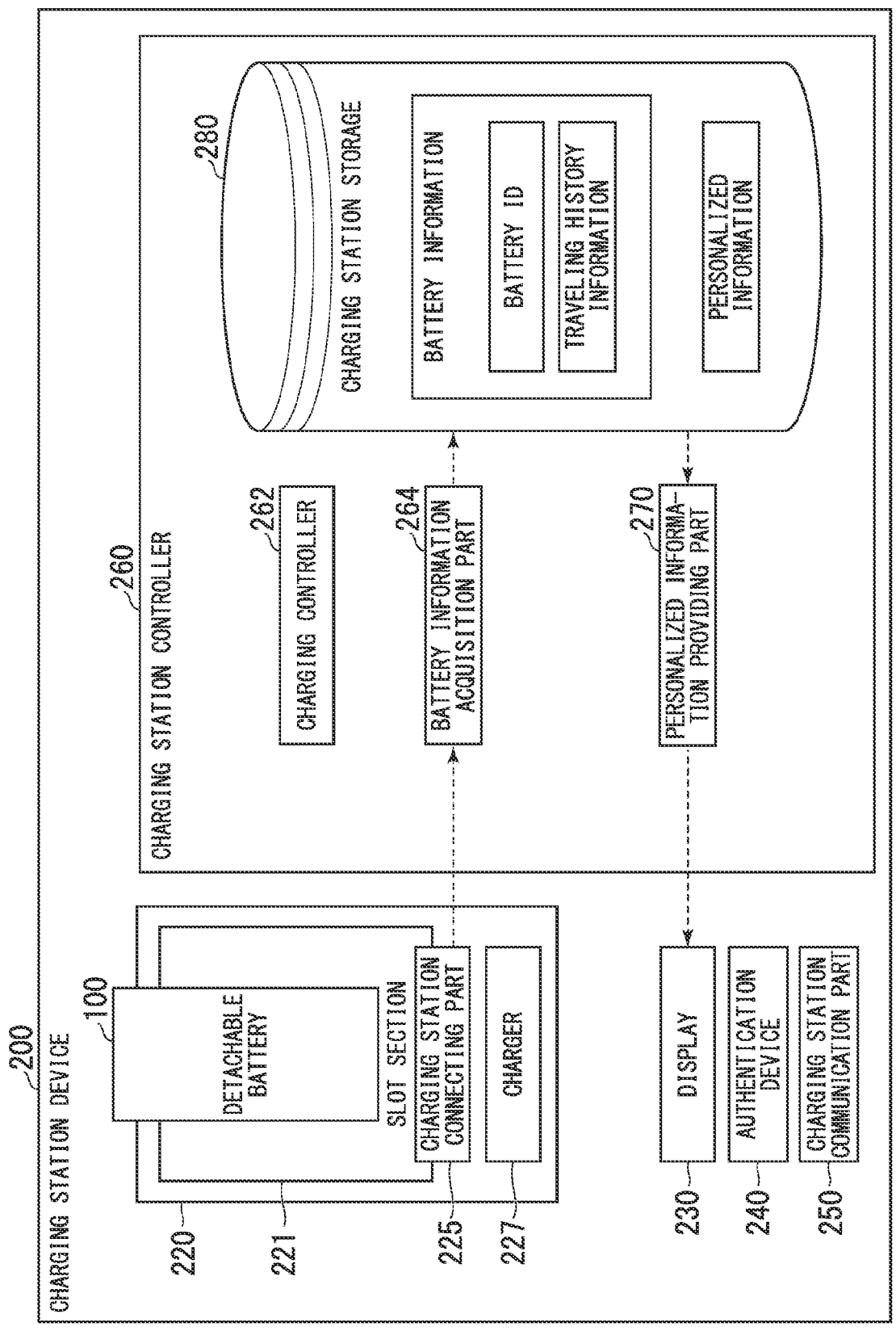
FIG. 6 is a view showing an example of a configuration of a charging station device.

FIG. 6 is a view showing an example of a configuration of the charging station device 200. As shown, the charging station device 200 includes, for example, a charging module 220, a display 230, an authentication device 240, a charging station communication part 250, and a charging station controller 260. The charging station device 200 is an example of the charging device. The charging module 220 is an example of the charging part. The display 230 is an example of the output part.

The charging module 220 includes, for example, the slot section 221, the charging station connecting section 224, and a charger 226.

The slot section 221 is a mechanism configured to receive and charge the detachable battery 100. The slot section 221 is an example of the rental part. The slot section 221 includes, for example, an upper stage slot 221U and a lower stage slot 221L. Since the upper stage slot 221U and the lower stage slot 221L have a configuration shared by them, and a configuration of the upper stage slot 221U will be described as a representative. The upper stage slot 221U includes, for example, a turntable that rotates around a vertical axis. The battery accommodating part is provided on the turntable. The battery accommodating parts are provided in regions of the turntable partitioned into four regions when seen in a plan view, respectively.

An outlet port is provided on the side of the charging module 220 facing the user 5 (a front surface side). The user 5 can put the detachable battery 100 in and out of the battery accommodating part disposed at the outlet port. The accommodating part disposed at the outlet port can be replaced by rotating the turntable. The four accommodating parts are partitioned by partition plates.

The charging module 220 rotates the turntable to position an empty battery accommodating part at the outlet port on the front surface side such that the detachable battery 100 returned from the user 5 is able to be received. Accordingly, the user 5 can return the exhausted detachable battery 100 to the empty battery accommodating part. When the detachable battery 100 is returned to the battery accommodating part, the battery ID of the detachable battery 100 is read and transmitted to the management server 300, and the management server 300 acquires a user ID associated with the battery ID and authenticates the user 5 with reference to a user information table stored in a server storage 350. When the user 5 is authenticated, the charging module 220 rotates the turntable and positions the battery accommodating part that accommodates the charged detachable battery 100 at the outlet port on the front surface side. Accordingly, the user 5 can take out the charged detachable battery 100 and attach it to the electrically driven vehicle 10. At the time of this rental, the charging station controller 260 transmits the user ID of the user and the battery ID of the newly rented detachable battery 100 to the management server 300.

The charging station connecting section 224 is provided on a bottom surface of each of the battery accommodating parts of the slot section 221. The charging station connecting section 224 is electrically connected to the connecting section 150 of the detachable battery 100 when the detachable battery 100 is accommodated in each of the battery accommodating parts of the slot section 221. The charging station connecting section 224 includes, for example, a connecting terminal (a battery terminal) of the electric power line configured to supply electric power to the detachable battery 100, a connecting terminal of a communication line configured to perform data communication (for example, serial communication) between the detachable battery 100 and the vehicle controller 14, or the like.

The charger 226 is provided on the bottom surface of each of the battery accommodating parts of the slot section 221. The charger 226 can be connected to the electricity accumulation part 120 of the detachable battery 100 via the charging station connecting section 224 to charge the electricity accumulation part 120. A power supply configured to supply electric power to the electricity accumulation part 120 is connected to the charger 226. When the charger 226 and the electricity accumulation part 120 are connected to each other, since the electric power line and the communication line are connected via the charging station connecting section 224 between the detachable battery 100 and the charging station device 200, charging of the detachable battery 100 and reception/transmission of the signal between the detachable battery 100 and the charging station device 200 become possible.

The display 230 is disposed at, for example, a left upper section of the charging module 220, and includes, for example, a touch panel (a touch sensor-attached display panel). The display 230 can provide various types of information to the user 5 while necessary information can be input according to an operation of the user 5. As described below, when the user 5 returns the detachable battery 100, the display 230 displays personalized information acquired by a personalized information providing part 270, which will be described below. The display 230 is an example of the output part.

The authentication device 240 is, for example, a device disposed at the left upper section of the charging module 220 in the vicinity of the display 230 and configured to perform authentication of the user 5. The authentication device 240 can read, for example, recorded information (an example of personal information) of a near field communication (NFC) card (not shown) carried by the user 5 using the NFC. Accordingly, the charging station devices 200 can authenticate the user 5 using the user ID included in the recorded information. While being described below in detail, normally, since the battery ID of the detachable battery 100 and the user ID are associated and managed by the management server 300, when the detachable battery 100 is returned, authentication of the user 5 associated with the detachable battery 100 can be performed by reading the battery ID of the detachable battery 100. Accordingly, authentication by the authentication device 240 may not be performed upon exchange of the detachable battery 100.

The charging station communication part 250 includes a wired communication device such as a terminal adaptor, an Ethernet (registered trademark) communication device, or the like, or a cellular communication device such as a Wi-Fi adaptor, 3G/LTE, or the like, and communicates with the management server 300, the mobile information terminal 400, and the like, via the network NW.

The charging station controller 260 includes a charging controller 262, a battery information acquisition part 264, and the personalized information providing part 270. The charging controller 262, the battery information acquisition part 264, and the personalized information providing part 270 are realized by executing a program (software) using a hardware processor such as a CPU or the like. In addition, some or all of the functions may be realized by hardware such as an LSI, an ASIC, an FPGA, a GPU, or the like, or may be realized by cooperation of software and hardware.

The charging controller 262 controls the charger 226 to fully charge the electricity accumulation part 120 on the basis of the SOC or the like of the electricity accumulation part 120 acquired from the detachable battery 100 via a signal line.

The battery information acquisition part (an example of the information acquisition part) 264 performs communication with the BMU 110 of the detachable battery 100 via the charging station connecting section 224, and acquires battery information from the storage 140 of the detachable battery 100 and stores the battery information in a charging station storage 280. In the example, the storage 140 provided on the detachable battery 100 may store a use aspect (a use state, a use history and an example of personal information) of the battery 100 while being attached to the electrically driven vehicle 10. The information stored in the storage 140 may be output to the storage 280 provided on the charging station device 200 that can be exchanged with the battery 100. "The storage 140 of the detachable battery 100" is an example of "the storage accompanied with the first battery module." The battery information (an example of personal information) includes the battery ID. The information acquired from the storage 140 by the battery information acquisition part 264 as the battery information may include at least one of, for example, traveling history information (see FIG. 4) and electric power consumption history information (see FIG. 5). Further, since the detachable battery 100 is a shared battery, for the purpose of privacy protection, the battery information acquisition part 264 may remove traveling history information, electric power consumption history information, or the like, from the storage 140 when the information is successively acquired from the storage 140.

The personalized information providing part 270 acquires personalized information that is information based on personal information such as battery information or the like, and outputs the personalized information to the display 230. More specifically describing, communication with a user information management part 322 of the management server 300 via the charging station communication part 250 is performed, personal information such as battery information or the like is transmitted to the management server 300, personalized information based on personal information is received from the management server 300 and stored in the charging station storage 280, and the personalized information is displayed on the display 230. Since there are various types of personalized information based on the personal information, examples of specific personalized information will be described below.

The charging station storage 280 is realized by a hard disk drive (HDD), a solid state drive (SSD), a flash memory, a random access memory (RAM), a read only memory (ROM), and the like. The charging station storage 280 stores the traveling history information, the battery ID, the personalized information, or the like, acquired from the storage 140 of the detachable battery 100. The charging station controller 260 transmits the information stored in the charging station storage 280 to the management server 300. The information stored in the charging station storage 280 may be transmitted to the management server 300 at timing when the battery information is acquired and stored in the charging station storage 280, and may be transmitted to the management server 300 at timing when a predetermined time interval or information of the charging station storage 280 is undated. Alternatively, the charging station controller 260 may output the information stored in the charging station storage 280 to the management server 300 according to requirements from the management server 300.

[Management Server 300]

Figure 7:
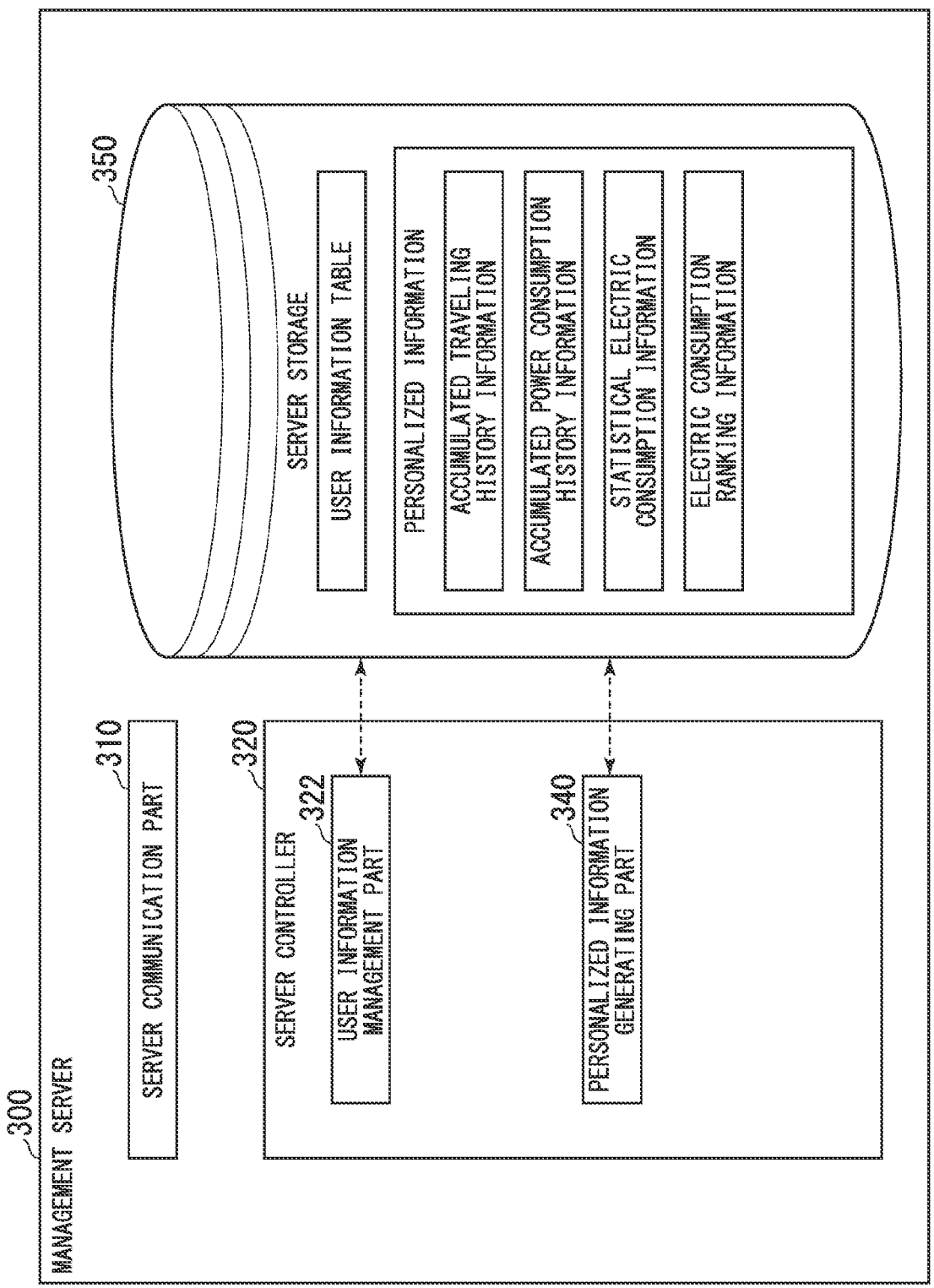
FIG. 7 is a view showing an example of a configuration of a management server.

FIG. 7 is a view showing an example of a configuration of the management server 300. The management server 300 is an example of the server device. As shown, the management server 300 includes, for example, a server communication part 310, a server controller 320, and the server storage 350. The management server 300 receives personal information from the charging station device 200 or the like, and generates personalized information to transmit the personalized information to the charging station device 200 by performing communication with the charging station devices 200 via the network NW.

The server communication part 310 includes a wired communication device such as a terminal adaptor, an Ethernet (registered trademark) communication device, or the like, or a cellular communication device such as a Wi-Fi adaptor, 3G/LTE, or the like, and communicates with the charging station devices 200, the mobile information terminal 400, or the like, via the network NW.

The server controller 320 includes, for example, the user information management part 322 and a personalized information generation part 340. The server controller 320 is realized by, for example, executing a program (software) using a hardware processor such as a CPU or the like. In addition, some or all of the functions may be realized by hardware such as an LSI, an ASIC, an FPGA, a GPU, or the like, or may be realized by cooperation of software and hardware. The server storage 350 is realized by the above-mentioned storage device.

FIG. 8 is a view showing an example of contents of a user information table. The user information management part (an example of the information acquisition part) 322 performs communication with the mobile information terminal 400 via the server communication part 310, receives user information (input information, and an example of personal information) input by the user 5 using an application program of the mobile information terminal 400, which will be described below, and generates a user information table as shown. In addition, in the charging station device 200, whenever the charged detachable battery 100 is rented to the user 5, the user ID of the user 5 and the battery ID of the newly rented detachable battery 100 are received from the charging station device 200, and the battery ID of the user ID in the user information table is updated by the battery ID received from the charging station device 200. Accordingly, since the user ID of the user information table is in a state always associated with the battery ID of the detachable battery 100 rented to the user 5, it is possible to specify the user 5 who is using the detachable battery 100 from the battery ID.

In addition, the user information management part 322 acquires battery information received from the charging station device 200 via the server communication part 310, retrieves the user information table stored in the server storage 350 on the basis of the battery ID included in the acquired battery information, acquires user information (an example of personal information) of the user ID in association with the battery ID, and stores the user information in the server storage 350. Further, the user information table is an example of the user information corresponding data.

The personalized information generation part 340 derives electricity consumption information indicating an electric power consumption rate (an example of electricity consumption, personal information) of the electrically driven vehicle 10 and stores the information in the server storage 350 on the basis of the traveling history information and the electric power consumption history information of the electrically driven vehicle 10 included in the acquired battery information. The personalized information generation part 340 can derive an electric power consumption rate (km/kWh) by dividing a movement distance (km) derived from the traveling history information with the electric power consumption amount (kWh) in a corresponding time. Further, the electric power consumption rate is a traveling distance per unit capacity of an electric power energy source (various types of power supplies, batteries, and the like), or an index indicating how much the vehicle can travel a certain distance using electric power, and may have unit other than [km/kwh] as long as it satisfies this index. For example, instead of calculating the movement distance from the traveling history information, information of a range meter (odometer) of the electrically driven vehicle 10 may be acquired as the movement distance. Alternatively, the personalized information generation part 340 may acquire an electric power consumption rate calculated by the vehicle controller 14 of the electrically driven vehicle 10. In the another example, the personalized information may be generated by devices other than the management server 300, for example, the charging station devices 200, the mobile information terminal 400, or the like.

FIG. 9 is a view showing an example of contents of accumulated traveling history information. The personalized information generation part 340 performs communication with the plurality of charging station devices 200 via the server communication part 310, acquires traveling history information (an example of personal information) of the plurality of electrically driven vehicles 10 stored in each of the storages 140 of the plurality of charging station devices 200, generates accumulated traveling history information obtained by accumulating traveling history information of the plurality of electrically driven vehicles 10 on the basis of plurality of pieces of acquired traveling history information, and stores the accumulated traveling history information in the server storage 350.

FIG. 10 is a view showing an example of contents of accumulated electric power consumption history information. The personalized information generation part 340 performs communication with the plurality of charging station devices 200 via the server communication part 310, acquires electric power consumption history information (an example of personal information) of the plurality of electrically driven vehicles 10 stored in the storage 140 of the plurality of charging station devices 200, generates accumulated electric power consumption history information obtained by accumulating electric power consumption history information of the plurality of electrically driven vehicles 10 on the basis of the plurality of pieces of acquired electric power consumption history information, and stores it in the server storage 350.

FIG. 11 is a view showing an example of contents of statistical electricity consumption information. The personalized information generation part 340 derives statistical electricity consumption information indicating an electric power consumption rate of each date of the plurality of electrically driven vehicles 10 and stores the information in the server storage 350 on the basis of the acquired accumulated traveling history information and the acquired accumulated electric power consumption history information. The personalized information generation part 340 can derive an electric power consumption rate (km/kWh) by dividing a movement distance (km) derived from the accumulated traveling history information with an electric power consumption amount (kWh) in a corresponding time, totalize electric power consumption rates on a daily basis for each user, and derive statistical electricity consumption information (an example of personalized information) as shown. Further, instead of calculating the movement distance from the traveling history information, the information of the range meter (odometer) of the electrically driven vehicle 10 may be acquired as the movement distance. Alternatively, the personalized information generation part 340 may acquire the electric power consumption rate calculated by the vehicle controller 14 of the electrically driven vehicle 10.

FIG. 12 is a view showing an example of contents of electricity consumption ranking information. The personalized information generation part 340 generates electricity consumption ranking information (relative ranking information, an example of personalized information) indicating a ranking of the electric power consumption rates of the plurality of users from the statistical electricity consumption information, and stores the information in the server storage 350. For example, the personalized information generation part 340 can generate electricity consumption ranking information by sorting the statistical electricity consumption information using a column of the electric power consumption rates of the statistical electricity consumption information as keys. For example, the personalized information generation part 340 may generate electricity consumption ranking information weekly, monthly, or the like. The personalized information generation part 340 generates information indicating a ranking of the electric power consumption rates of the user 5 showing the electricity consumption information in the generated electricity consumption ranking information, and stores the information in the server storage 350.

FIG. 13 is a view showing an example of contents of activity range information (an example of personal positional information (personal information)). The personalized information generation part 340 derives traveling history information of the user 5 in the accumulated traveling history information, generates user activity range information indicating a activity range of the user 5 from the history in which the user 5 has traveled in the past, and stores the information in the charging station storage 280. In this example, the activity range information may include predicted positional information (an example of personal positional information (personal information)) of the battery 100 used by the user in the future. For example, the predicted positional information may be obtained on the basis of the positional information (positioning information) of the battery in the present and the positional information (traveling history information) of the battery in the past. The personalized information generation part 340 can derive, for example, a main activity range (an example of personalized information) of the user 5 by performing the predetermined statistical processing on the positional information included in the accumulated traveling history information. For example, the predetermined statistical processing may be performed to obtain a center of gravity (center coordinates in FIG. 13) of the plurality of pieces of positional information and obtain a distance (an action radius in FIG. 13) from a center of gravity to positional information at the farthest position while removing outlier values from the positional information included in the accumulated traveling history information. The predetermined statistical processing may be regression analysis, machine learning, or the like.

The personalized information generation part 340 generates personalized information on the basis of various types of information generated on the basis of the personal information as described above, performs communication with the charging station device 200 via the server communication part 310, and transmits the generated personalized information to at least one of the charging station device 200 and the mobile information terminal 400. Since the personalized information may be various types of information, specific examples of the personalized information will be described later.

The server storage 350 is realized by an HDD, an SSD, a flash memory, a RAM, a ROM, or the like. The server storage 350 stores user information table, user information, electricity consumption information, accumulated traveling history information, accumulated electric power consumption history information, statistical electricity consumption information, electricity consumption ranking information, activity range information, and the like.

[Mobile Information Terminal 400]

Figure 14:
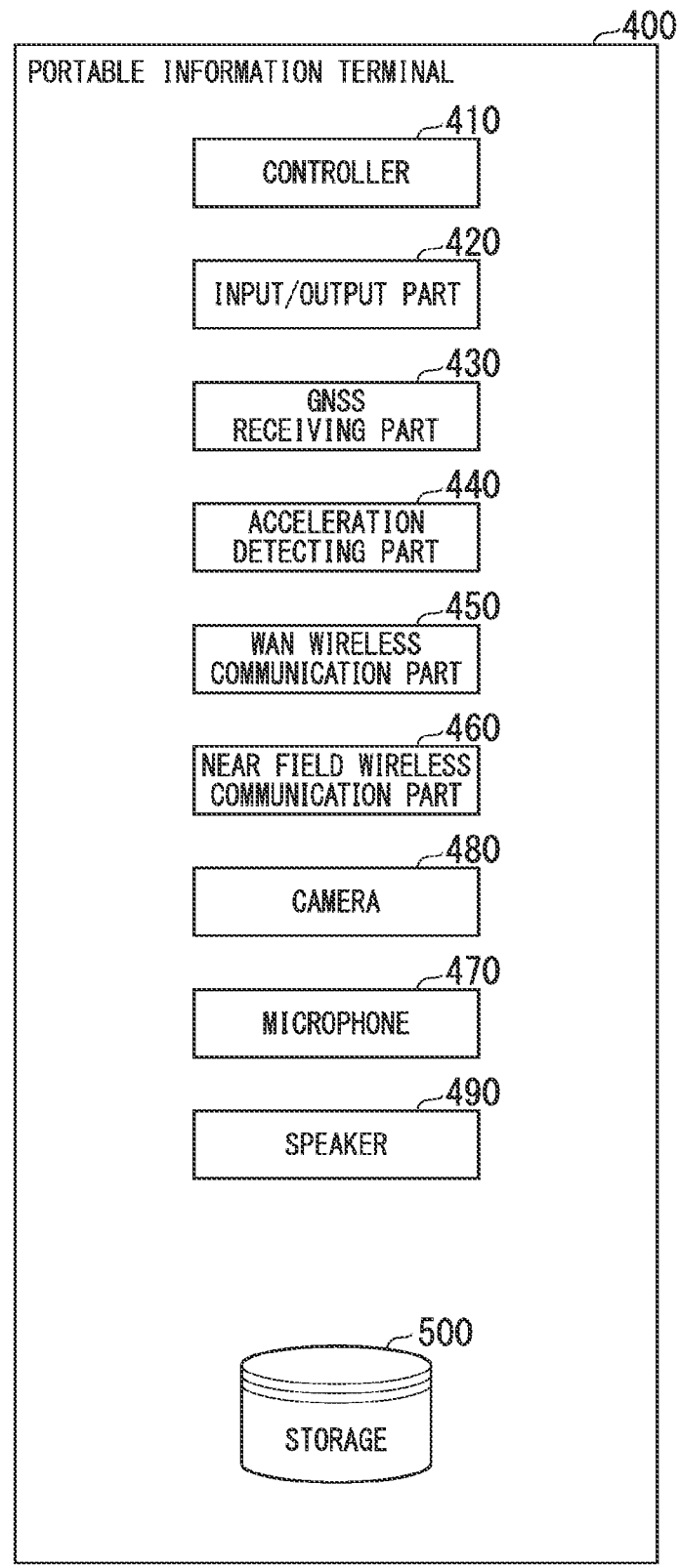
FIG. 14 is a view showing an example of a configuration of a mobile information terminal.

FIG. 14 is a view showing an example of a configuration of the mobile information terminal 400. The mobile information terminal 400 may be, for example, an information terminal such as a smart phone, a tablet terminal, a personal computer, or the like, used by the user 5 of the electrically driven vehicle 10. Alternatively, the mobile information terminal 400 may be configured as an embedded type device.

The user 5 can input user information (an example of personal information) to the mobile information terminal 400 carried by the user 5, and can transmit user information to the management server 300 by performing communication with the management server 300 via the network NW. The user 5 can perform various operations according to the battery sharing service as the operations are performed at the mobile information terminal 400. Details will be described below in detail.

As shown, the mobile information terminal 400 includes a controller 410, an input/output part 420, a mobile information terminal GNSS receiving part 430, an acceleration detecting part 440, an WAN wireless communication part 450, a near field wireless communication part 460, a camera 480, a microphone 470, a speaker 490, and a storage 500.

The controller 410 is realized by, for example, executing a program (software) using a hardware processor such as a CPU or the like. In addition, some or all of the functions may be realized by hardware such as an LSI, an ASIC, an FPGA, a GPU, or the like, or may be realized by cooperation of software and hardware.

The storage 500 includes, for example, any one or more of a non-volatile storage device such as a ROM, a flash memory, or the like, and a volatile storage device such as a RAM, a resister, or the like. A software program executed by a processor may be previously stored in the storage 500, or may be download from an external device, a portable recording medium, or the like, or via a communication line. The storage 500 stores various types of setting information that cause the mobile information terminal 400 to function as a communication terminal, and a basic program such as an operating system (OS) or the like. Further, in addition to the above, the storage 500 stores various types of information and an application program that realize the function as the mobile information terminal 400 of the embodiment.

The input/output part 420 includes a display part such as a liquid crystal display or the like that displays various types information, and an operation detecting part. The input/output part 420 may be configured as a touch panel in which a display part and an operation detecting part are combined.

The mobile information terminal GNSS receiving part 430 positions a location of the mobile information terminal 40 on the basis of the radio wave coming from a GNSS satellite such as a GPS satellite or the like. The mobile information terminal GNSS receiving part 430 outputs the acquired position of the mobile information terminal 400 to a battery control device 180.

The acceleration detecting part 440 includes an acceleration sensor (or a gyro), and detects a force applied to the mobile information terminal 400.

The WAN wireless communication part 450 includes an antenna (not shown), and communicates with the management server 300 via the network NW. For example, a communication type of the WAN wireless communication part 450 may be a third generation, fourth generation, fifth generation mobile communication system (3G, 4G, 5G), a long term evolution (LTE) type communication system, a wireless LAN (Wi-Fi), or the like.

The near field wireless communication part 460 includes an antenna (not shown), and communicates with another wireless device (for example, a wireless device (not shown) of the electrically driven vehicle 10) disposed relatively close thereto via a near field communication BT. For example, the wireless communication type may be Bluetooth (registered trademark), near field communication (NFC), or the like.

The camera 480 includes an optical system and an image pick-up device, and images a space that is in an optical axis direction of an optical system. For example, the camera 480 is provided on a surface of the mobile information terminal 400 on which the input/output part 420 is provided. The controller 410 is used to enable the mobile information terminal 400 to make video calls using the camera 480, and image the user 5 of the mobile information terminal 400.

The microphone 470 and the speaker 490 are used, for example, when the mobile information terminal 400 is used as a device for calling. In addition, the controller 410 may use the microphone 470 as a sensor configured to collect sound around the mobile information terminal 400, or may output a voice call ringtone from the speaker 490.

The user 5 can download an application program for the user of the electrically driven vehicle 10 from a predetermined server, and store the application program in the storage 500 and install the application program. When the user 5 selects an icon indicating an application program and instructs to perform the application program, the CPU of the controller 410 performs the following user information registration processing or the like by reading and executing the application program stored in the storage 500.

In the user information registration processing, the user 5 can input the information including, for example, an address, a name, a gender, an age, a family structure, and the like, of the user 5 using the user application into the input/output part 420, and transmit the information to the management server 300 as the user information (an example of personal information). The user 5 may be prompted to input the user information as a user registration and an accompanying survey to receive customer support of the electrically driven vehicle 10 when the user 5 purchases the electrically driven vehicle 10. In addition, when the electrically driven vehicle 10 is a share motorcycle (a rented motorcycle), the user 5 may be prompted to input the user information as the user registration and the accompanying survey when the user 5 subscribes to the motorcycle share service. In this case, the user 5 can also perform a rental procedure or the like of the electrically driven vehicle 10 using the application program.

The application program can display various types of information related to the electrically driven vehicle 10 on the input/output part 420. In addition, the user 5 can perform setting related to the electrically driven vehicle 10 using the application program. Further, the application program can display a station map (positional information (an example of personal information) of the charging station devices 200) indicating the location of the charging station device 200 on the input/output part 420 through communication via the management server 300 or the like and the WAN wireless communication part 450. Then, the application program can display a current position of the user 5 on a station map and display neighboring station information related to the charging station device 200 around the user 5 on the basis of the location of the mobile information terminal 400 acquired by the mobile information terminal GNSS receiving part 430. In the example, the station map may include at least one of positional information (an example of personal positional information (personal information)) of the charging station device (storage device) 200 presently used by the user, positional information (an example of personal positional information (personal information)) of the charging station devices 200 used by the user in the past, and positional information (an example of personal positional information (personal information)) of the charging station device 200 that will be used by the user in the future. For example, the positional information in the future may be obtained on the basis of the positional information in the present and the positional information in the past.

[Example of Personalized Information]

According to the configuration of the above-mentioned service system 1, the user 5 displays the personalized information, which is the information that is personalized, on the display 230 of the charging station device 200 on the basis of the battery information acquired from the detachable battery 100 returned to the charging station device 200 when the detachable battery 100 is exchanged at the charging station device 200. Hereinafter, an example of the personalized information displayed on the display 230 of the charging station device 200 will be described.

The personalized information may be, for example, information including at least one of information, advertisement and incentive regarding at least one of facilities (shop, commercial facilities, public facilities, and the like) and events that are within an activity range of the user 5 indicated by the vicinity of the charging station device 200 or the user activity range information. The incentive is, for example, a coupon. The incentive will be described in a fourth embodiment.

As described above, user information of the user 5 can be acquired during use of the detachable battery 100 by retrieving the user information table with the user information management part 322 of the management server 300 on the basis of the battery ID of the returned detachable battery 100. For example, it is assumed that a battery with a battery ID "00123" is returned to the charging station device 200. In this case, it can be seen that a 30-year-old housewife has performed a battery exchange by retrieving the user information table. Since the user 5 is a 30-year-old housewife, it is conceivable that the user 5 will purchase food for dinner and it is conceivable to display advertisement (an example of personalized information) or a coupon (an example of personalized information) of a supermarket or complex type commercial facilities on the display 230, or, since there are two children, to display information (an example of personalized information) of the events to which the children can attend on the display 230. The supermarket is an example of the shop. The complex type commercial facility is an example of the facilities. According to this configuration, since it is possible to provide the personalized information appropriate for needs of the user 5, useful information for the user 5 can be provided, and further, it is possible to provide an advertising medium (an example of personalized information) that is highly effective for advertisers.

The personalized information may include, for example, an enterprise advertisement. In addition, the personalized information may include at least one of, for example, maintenance information (automobile inspection, a repair, or the like), insurance information, and purchase support information (a loan or the like) of the electrically driven vehicle (the electric power device) 10. The user information table shown in FIG. 8 is an example, and the user information table may further include, for example, information of a date of expiration of vehicle insurance or a loan. In this case, the advertisement (an example of personalized information) of the vehicle insurance can be displayed according to the date of expiration of the vehicle insurance of the user 5. In addition, it is possible to display the advertisement (an example of personalized information) of the loan that the user may be interested in.

The personalized information may be information starting from the charging station devices 200 or the user information. For example, the personalized information may include proposal of exchange timing or an exchange place of the detachable battery 100 for the next exchange generated on the basis of the electric power consumption history information. In addition, when the distance to the other charging station device 200 is considered, the personalized information may include proposal of exchange timing or an exchange place of the detachable battery 100 of the next time generated on the basis of the traveling history information, the electric power consumption history information, and the information of the position of the other charging station device 200. For example, "the proposal of the exchange timing or the exchange place of the detachable battery 100 of the next time" is an example of "recommendation information related to the storage device used by the user at the next time," "recommendation information related to at least one of exchanges of the battery module at the next time with other battery modules" or "recommendation information related to the charging of the next time of the second battery module."

The personalized information may be at least one of, for example, weather forecast (an example of weather information) and traffic information in a region including the vicinity of the charging station device 200 or the activity range of the user 5 indicated by the user activity range information. The weather forecast includes, for example, rainfall information. The traffic information includes, for example, congestion prediction information (an example of congestion information (traffic information)). According to this configuration, convenience of the user 5 can be increased and energy saving or congestion avoidance can be realized by providing weather forecast or traffic information of the place where the user 5 actually travels.

The personalized information may include, for example, information (an example of traffic information) related to the traffic safety based on the traveling history information. The information related to the traffic safety may be, for example, information related to regions including the vicinities of the charging station devices 200 or the activity range of the user 5 indicated by the user activity range information. The information related to the traffic safety may include, for example, information of a point where traffic accidents frequently occurs provided from the police or the like. In addition, the information related to the traffic safety may include, for example, a warning notice for a place where the user 5 is overspeeding in the traveling history information of the user 5. In addition, the information related to the traffic safety may include, for example, a warning notice at a place where large number of drivers tend to overspeed in the accumulated traveling history information. According to this configuration, safety consciousness of the user 5 can be increased and traffic accidents can be reduced by providing information related to the traffic safety at a place where the user 5 actually travels.

The personalized information may include, for example, a driving advice (an example of traffic information) with respect to the user 5 related to vicinities of the charging station devices 200 or a region including an activity range of the user 5 indicated by the user activity range information. The personalized information may include, for example, electricity consumption information derived by an electricity consumption information derivation part 323. Accordingly, visualization of the electric power consumption rate can be realized. The personalized information may include, for example, an electricity consumption improving route based on accumulated traveling history information generated by an accumulated traveling history information generation part 324 and electric power consumption history information generated by an accumulated electric power consumption history generating part 326.

The personalized information may include, for example, information obtained by comparing electricity consumption information and statistical electricity consumption information of the electrically driven vehicle 10. For example, in comparison with the electric power consumption rate (electricity consumption) of another user, the electric power consumption rate of the user 5 can be evaluated, and comments of the electric power consumption rate achieved by the user 5 can be included in the personalized information.

The personalized information may include, for example, a ranking of the electric power consumption rate achieved by the user 5 in the electricity consumption ranking information that is the electricity consumption ranking generated on the basis of the statistical electricity consumption information generated by an electricity consumption ranking information generation part 330. In addition, the electricity consumption ranking may be an electricity consumption ranking in all users of the charging station devices 200, or may be an electricity consumption ranking of the user who uses a specified charging station device 200.

Since the personalized information of the embodiment limits the geographical scope of the provided information by using the charging station device 200 as an information source, it is possible to provide more appropriate information.

[Sequence Diagram]

Figure 15:
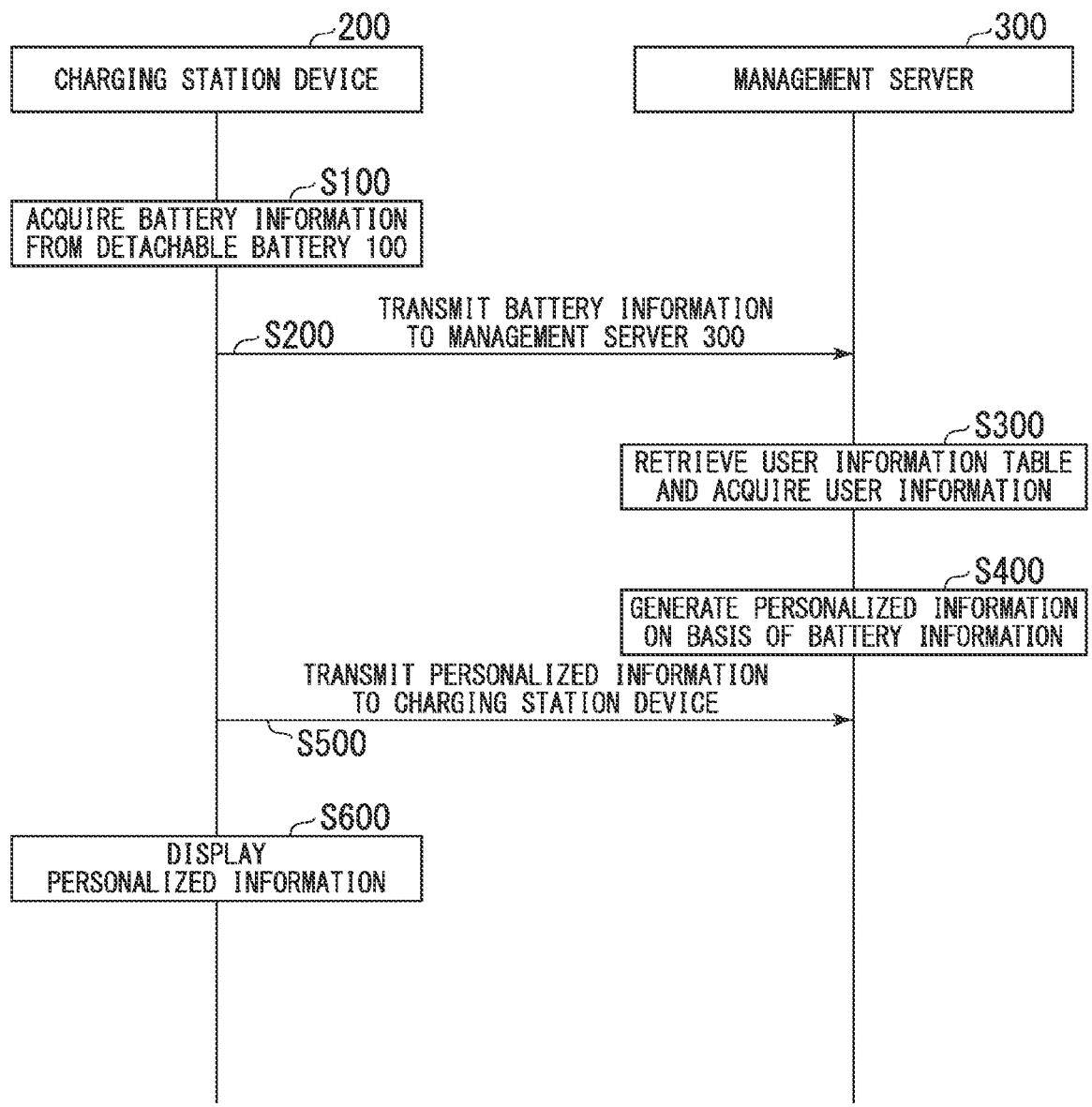
FIG. 15 is a sequence diagram showing an example of processing of providing personalized information by a service system.

FIG. 15 is a sequence diagram showing an example of processing of providing personalized information by the service system 1.

The user 5 parks the electrically driven vehicle 10 near the charging station device 200, the detachable battery 100 is removed from the electrically driven vehicle 10, the detachable battery 100 is input into the empty battery accommodating part of the slot section 221 from the outlet port of the charging module 220 of the charging station device 200, and thus, the user 5 returns the detachable battery 100 to the charging station device 200. When the detachable battery 100 is accommodated in the battery accommodating part, the connecting section 150 of the detachable battery 100 is connected to the charging station connecting section 224 of the charging station device 200, and charging by the electric power line and the communication line and reception/transmission of the signal become possible. The charging station controller 260 of the charging station device 200 acquires the traveling history information and the battery ID of the detachable battery 100 via the communication line, and stores them in the charging station storage 280 (step S100). The charging station controller 260 transmits the acquired traveling history information and the battery ID to the management server 300 via the charging station communication part 250 (step S200).

The management server 300 retrieves the user information table on the basis of the battery ID received from the charging station device 200, and acquires user information of the user ID in association with the battery ID (step S300). The server controller 320 of the management server 300 generates personalized information on the basis of the acquired traveling history information and user information (step S400). The server controller 320 transmits the generated personalized information to the charging station device 200 via the server communication part 310 (step S500).

The charging station controller 260 of the charging station device 200 displays the personalized information received from the management server 300 via the charging station communication part 250 on the display 230 (step S600). As described above, the processing of providing the personalized information by the service system 1 is terminated.

Second Embodiment

Figure 16:
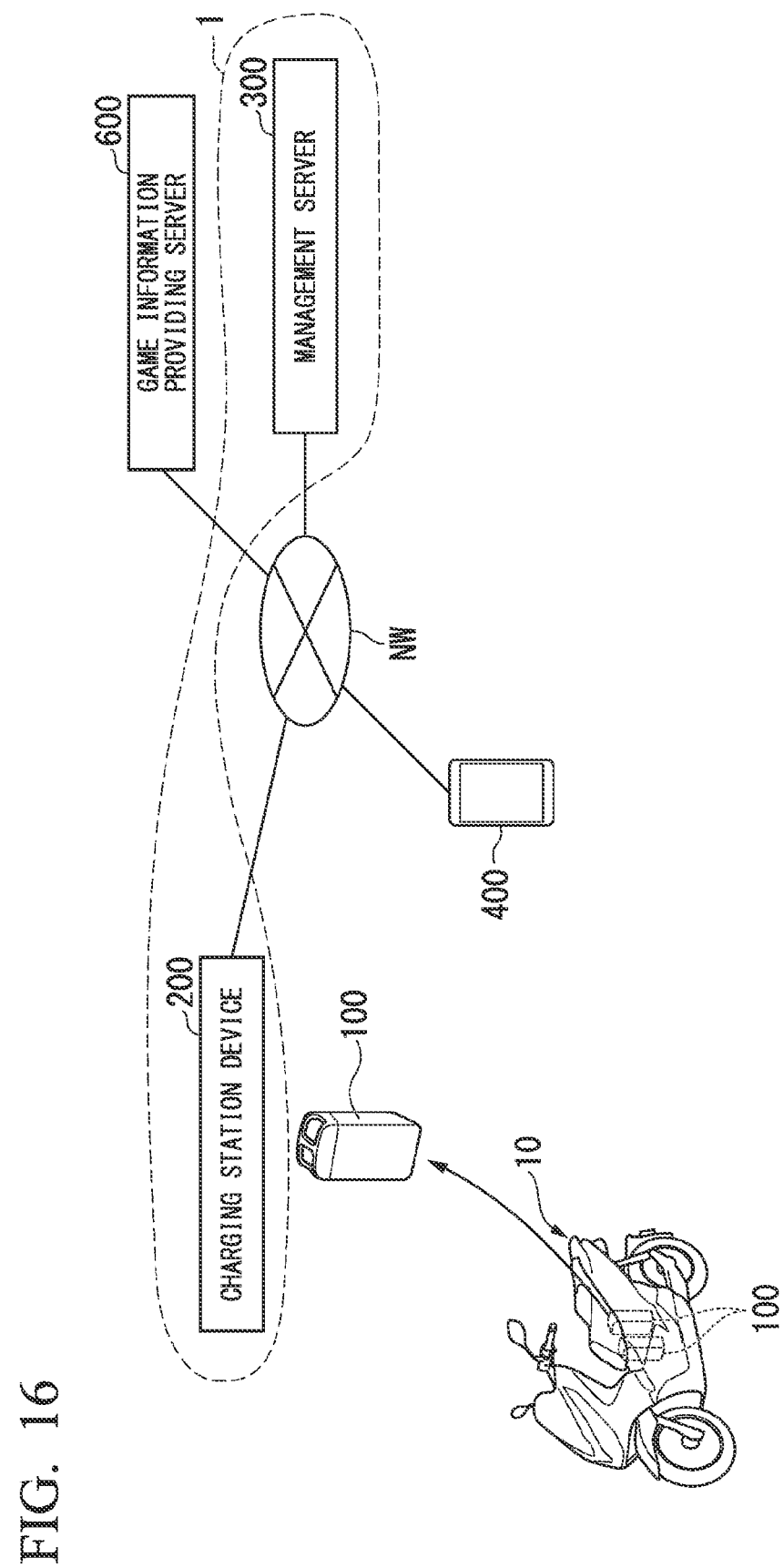
FIG. 16 is a configuration view showing an example of a service system constituted by a charging station device and a management server according to a second embodiment as a whole.

FIG. 16 is a configuration view showing an example of a service system 1 constituted by a charging station device 200 and a management server 300 according to a second embodiment as a whole. FIG. 16 shows the electrically driven vehicle 10, the detachable battery 100, the mobile information terminal 400, and a game information providing server 600, which use the battery sharing service, together. The game information providing server 600 is an example of the game information providing server device.

While the charging station device 200 and the management server 300 according to the second embodiment have the same configurations as the charging station device 200 and the management server 300 according to the first embodiment, in the second embodiment, the personalized information generation part 340 of the management server 300 transmits the generated personalized information to the game information providing server 600.

For example, the user 5 can operate the mobile information terminal 400, download the application program of the location-based game in which game contents are changed on the basis of the positional information of the mobile information terminal 400 from the predetermined server, and store application program of the location-based game in the storage 500 to install the application program. When the user 5 selects an icon indicating the application program of the location-based game and instructs to execute the application program of the location-based game, the CPU of the controller 410 executes the location-based game by reading and executing the application program of the location-based game stored in the storage 500.

The game information providing server 600 is an application server device configured to perform delivery of game information by performing communication with the mobile information terminal 400 in which the application program of the location-based game is started. The game information providing server 600 outputs, for example, game information (game setting information) that displays information related at least one of an item, a character and an event of the location-based game on the mobile information terminal 400, in which the application of the location-based game is executed, on the basis of the personalized information generated on the basis of the battery information. The game information providing server 600 may output, for example, game information (game setting information) for determining at least one of a type, a content, an appearance ratio, and an attribute regarding at least one of the item, the character, and the event of the location-based game. In the example, game information (game setting information, an example of personalized information) is generated on the basis of at least one of personal information (electricity consumption information or the like) and other parameters. The other parameters may include at least one of, for example, a charging situation of the battery 100 in the plurality of charging station devices 200, an accumulated use history of the plurality of electrically driven vehicles 10, and an action history of a plurality of users. In other examples, game information (game setting information, an example of personalized information) is generated on the basis of the personalized information (electricity consumption ranking information or the like).

FIGS. 17 to 21 are views schematically showing an example of a concept of the location-based game. For example, the location-based game may be (1) a combination of item acquisition elements on the basis of positional information in a puzzle game (FIG. 17), (2) an encampment battle game using positional information (FIG. 18), (3) a monster collecting game using positional information (FIGS. 19 to 21), (4) a communication game in a village where animals live (FIG. 22), and the like. In these games, items, characters, events, and the like, are generated on the basis of the positional information.

Figure 19:
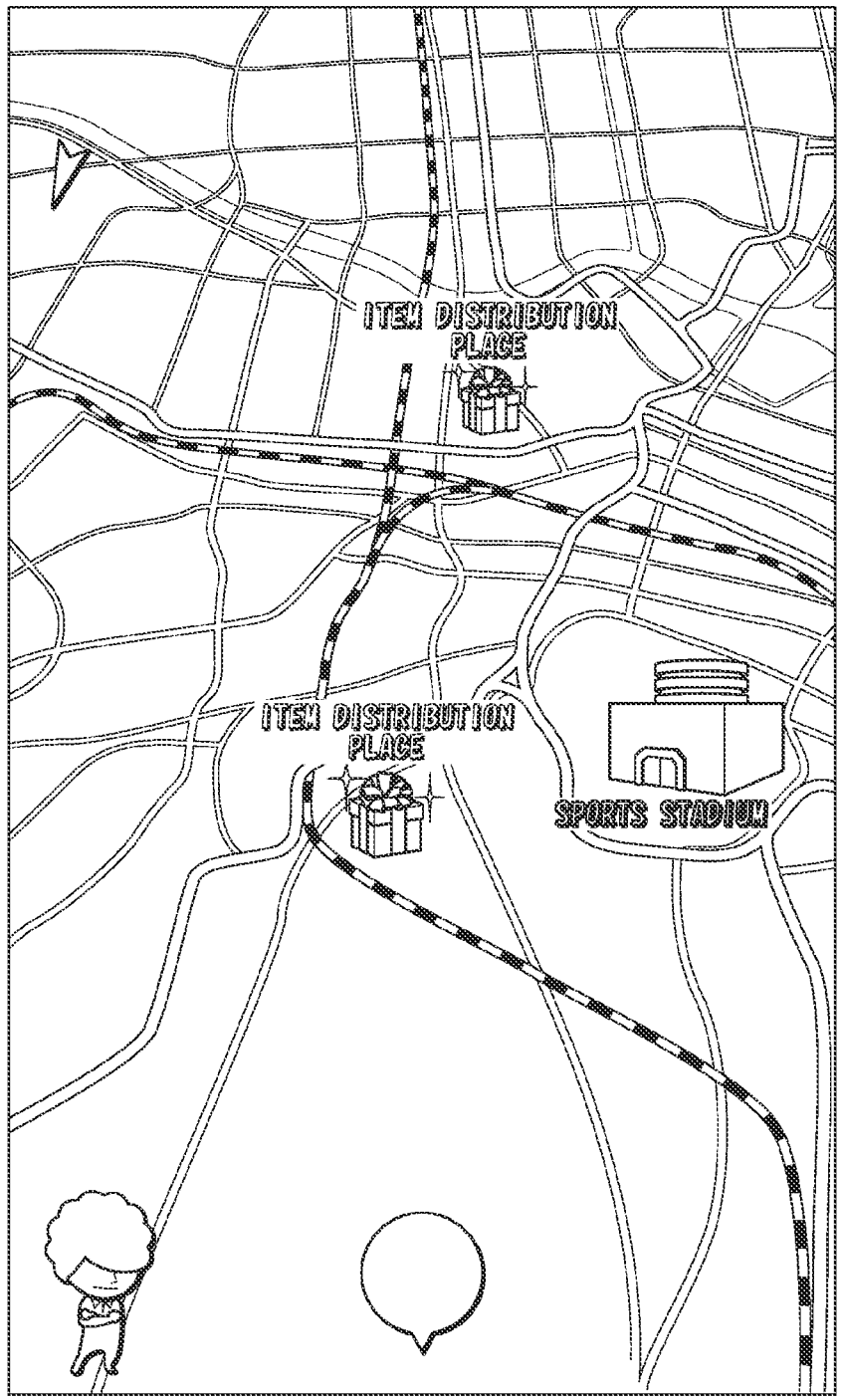
FIG. 19 is a view schematically showing the example of the concept of the location-based game.
Figure 20:
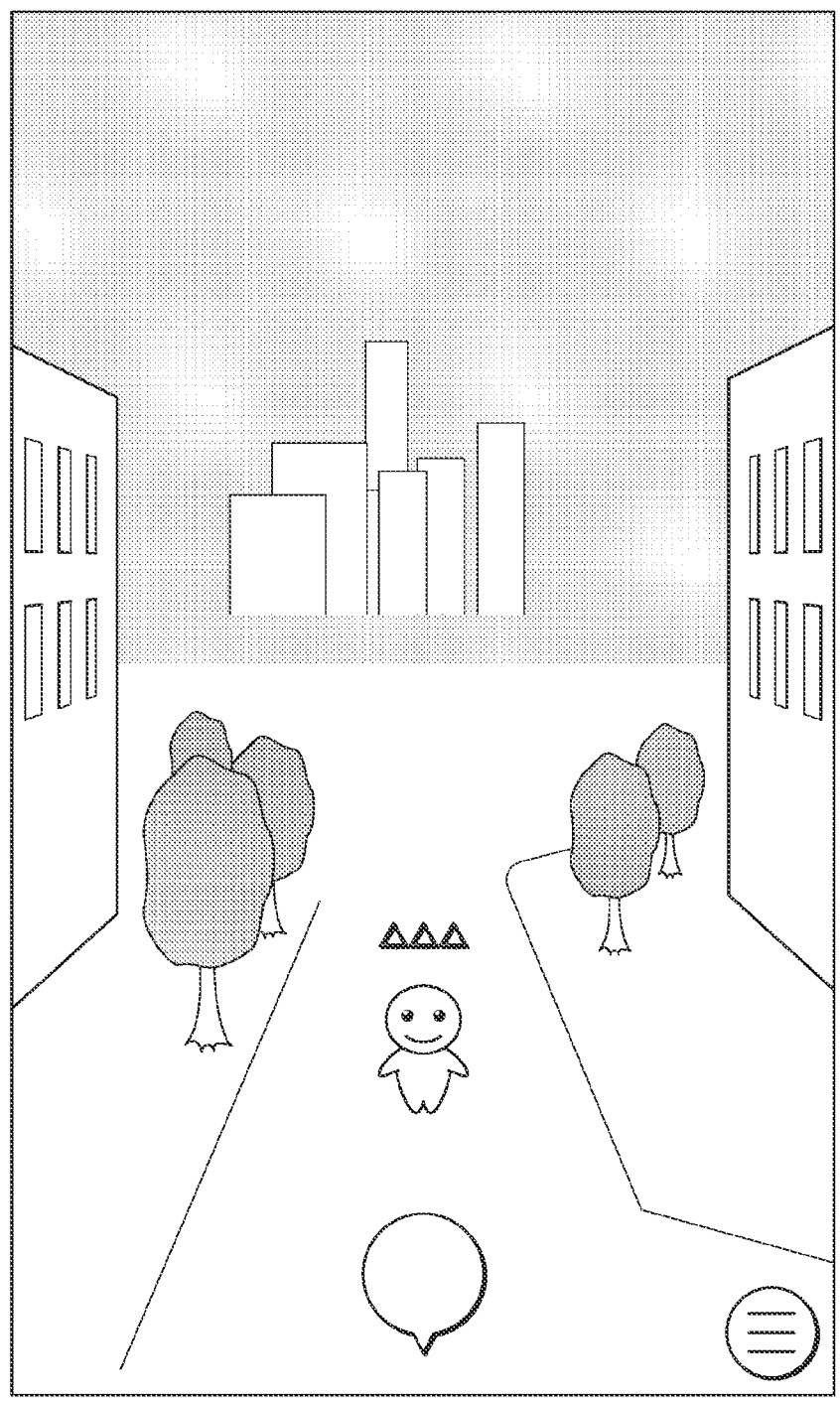
FIG. 20 is a view schematically showing the example of the concept of the location-based game.
Figure 21:
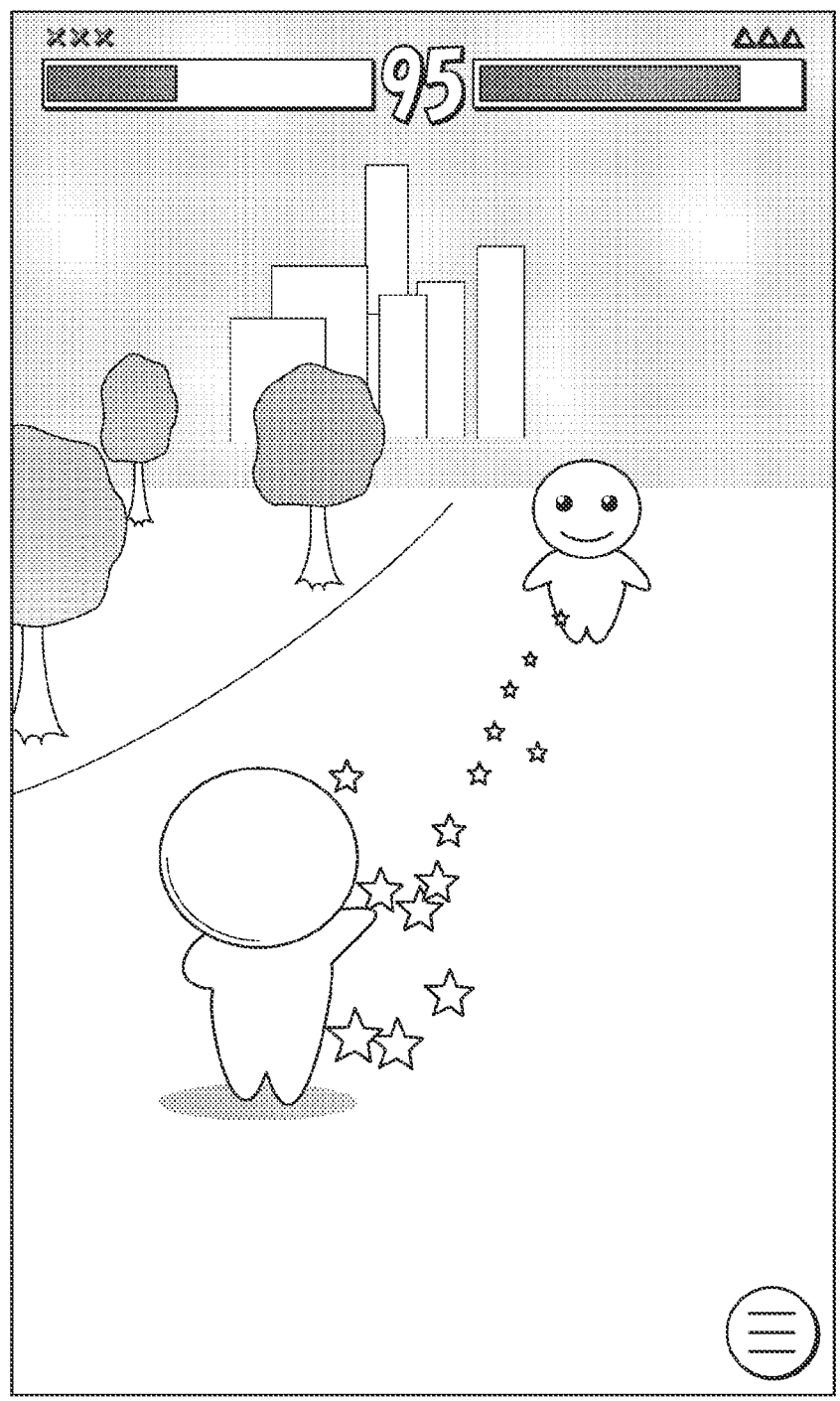
FIG. 21 is a view schematically showing the example of the concept of the location-based game.
Figure 22:
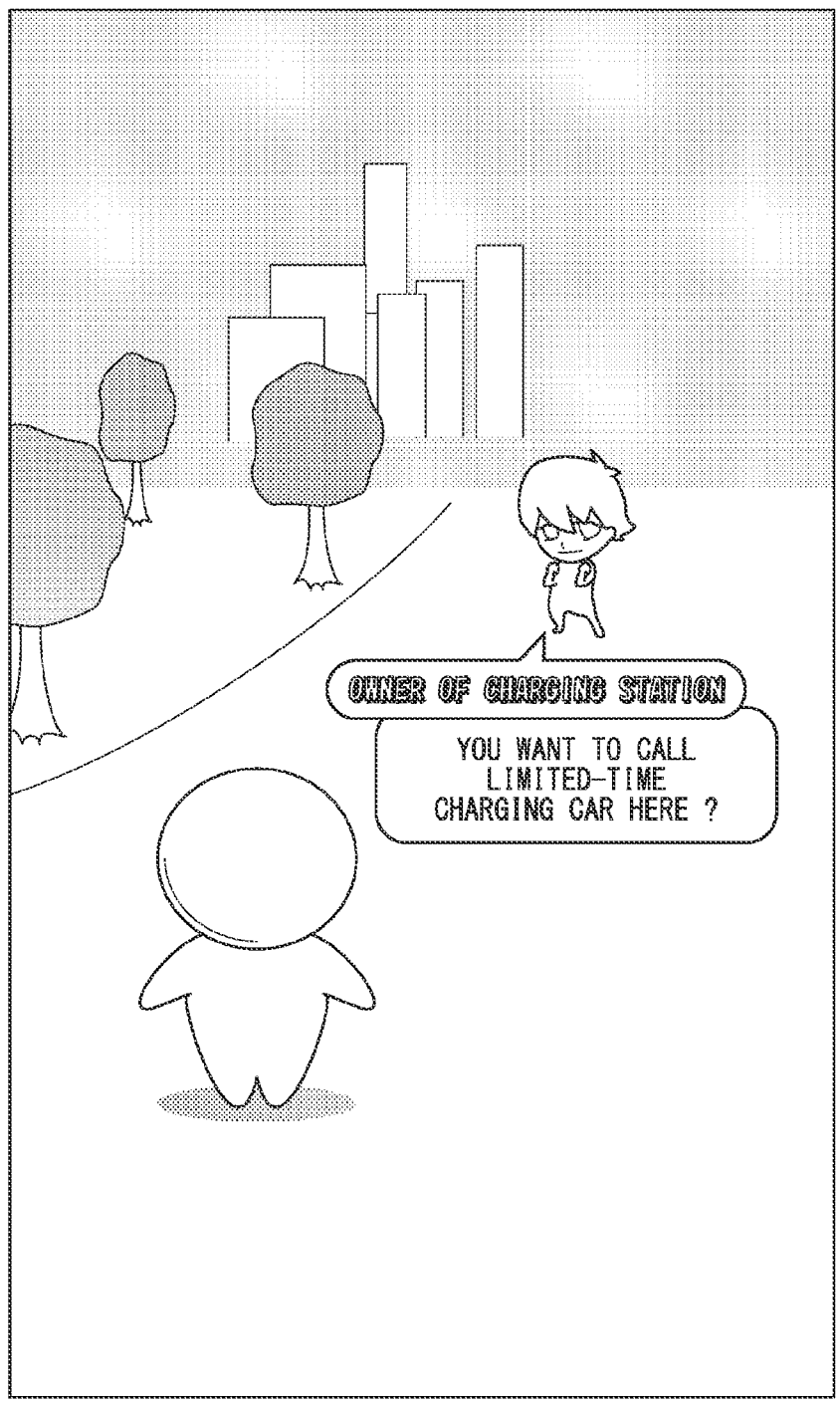
FIG. 22 is a view schematically showing the example of the concept of the location-based game.

For example, the personalized information generation part 340 of the management server 300 generates personalized information on the basis of the electricity consumption information derived by the electricity consumption information derivation part 323 or electricity consumption ranking information generated by the electricity consumption ranking information generation part 330. For example, when the monster collecting game exemplified in FIGS. 19 to 21 is executed by the mobile information terminal 400, the personalized information generation part 340 of the management server 300 transmits the personalized information including the information related to appearance of the items of the monster collecting game to the game information providing server 600 according to the electricity consumption information. For example, when the electricity consumption information indicating a high electric power consumption rate is acquired from the battery 100, the personalized information including the information related to appearance of popular items with a high scarcity value is transmitted to the game information providing server 600. For example, the items may be user-limited items of the specified charging station device 200.

Figure 17:
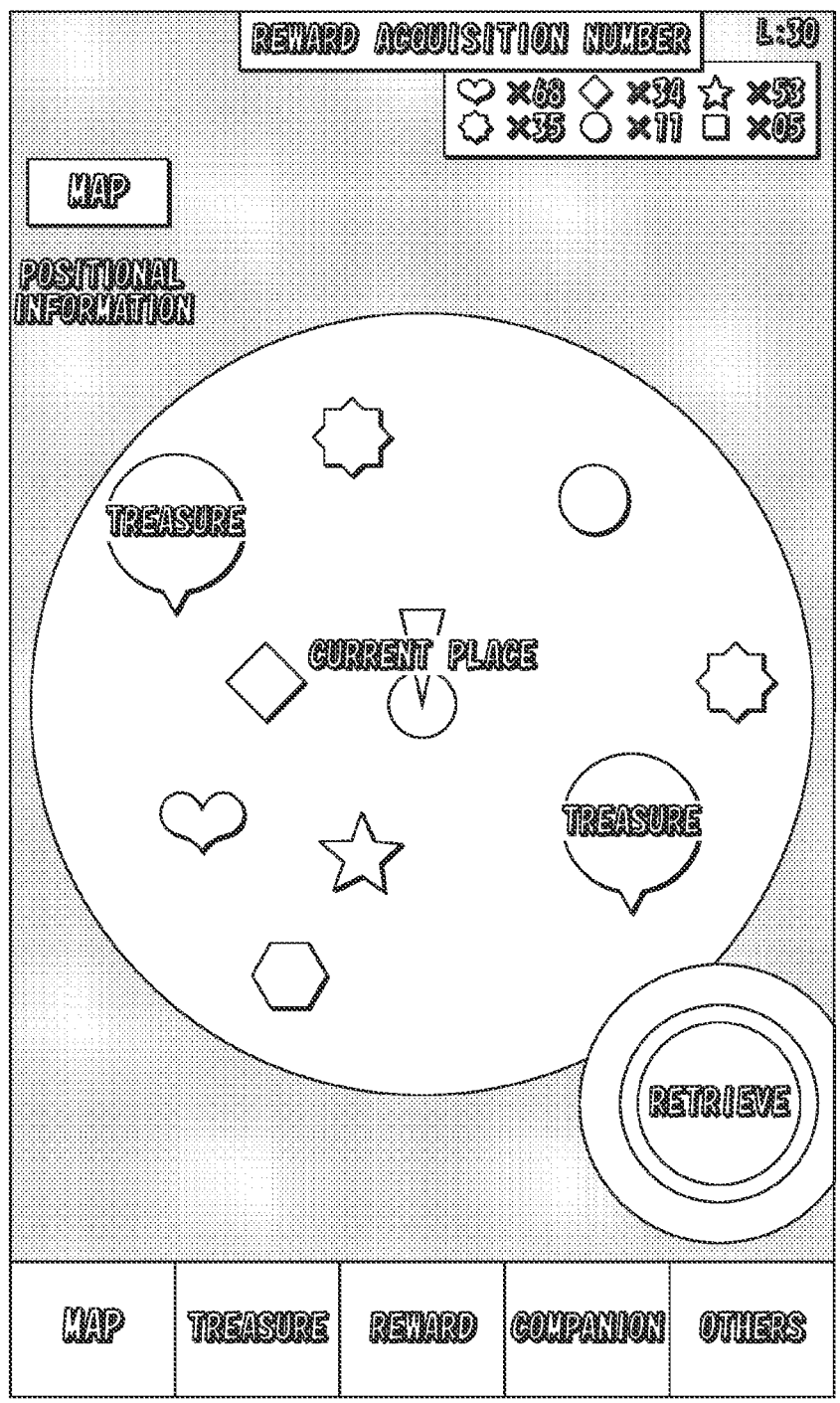
FIG. 17 is a view schematically showing an example of a concept of a location-based game.
Figure 18:
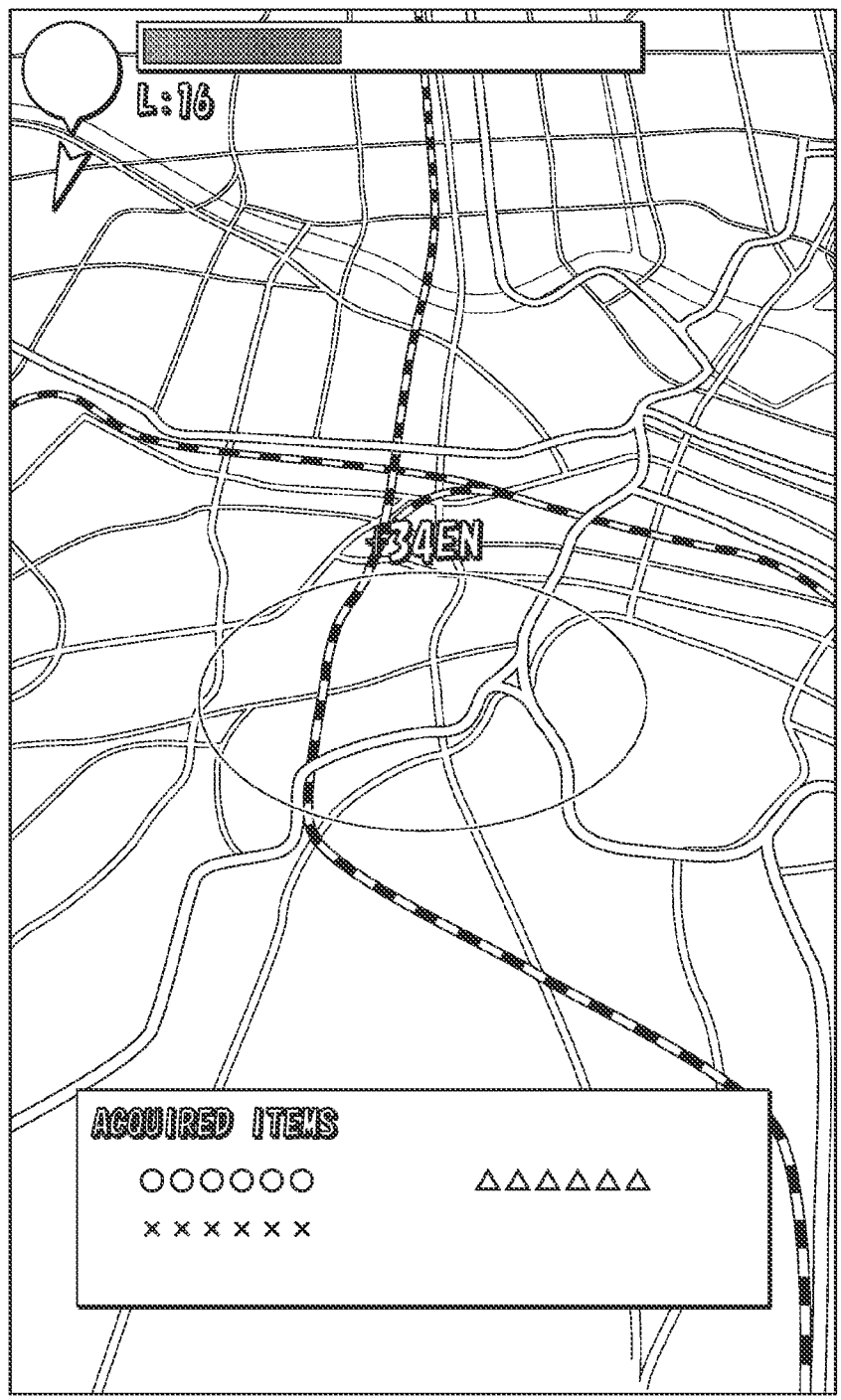
FIG. 18 is a view schematically showing the example of the concept of the location-based game.

Even in the puzzle game shown in FIG. 17 and the encampment battle game shown in FIG. 18, similarly, for example, the items can be applied on the basis of the above-mentioned electric power consumption rate. Application of the items based on the electric power consumption rate is an example, for example, on the basis of the acquired battery information, driving of the user 5 may be determined on the basis of the traveling speed, the abrupt acceleration, the abrupt deceleration, and the like, and may be calculated as an index value of the safety driving, and a predetermined item may be applied when the index value of the safety driving is higher than a predetermined threshold.

On the basis of the game information transmitted on the basis of the personalized information based on the battery information, what is given in the location-based game is not limited to the item, and may be a character or an event. For example, in the communication game shown in FIG. 22, when the user 5 exchanges the detachable battery 100 at the specified charging station device 200 and then the user 5 performs a specified operation in the communication game, an event in which the owner of the charging station in the shape of an animal appears and is asked "You want to call a limited-time charging car here?" occurs. When a positive answer to this question is given, the character (for example, a charging car) will appear. Appearance of the above-mentioned event or character is not caused by simply exchanging the detachable battery 100 with the charging station device 200, and it may be set such that the event or the character occurs when the electric power consumption rate or the index value of the safety driving is equal to or greater than the predetermined threshold.

The game information providing server 600 transmits the game information indicating the item to the mobile information terminal 400 on the basis of the received personalized information. The application of the location-based game running on the mobile information terminal 400 displays the item according to the game information received from the game information providing server 600.

In the related art, when the location-based game is played on the basis of the positional information of the mobile information terminal GNSS receiving part 430 of the mobile information terminal 400, the user was able to move as much as possible as long as time and money allows using any traffic institution. As a result, a person having a lot of time and transportation expense to spend, and having funding ability in their spare time had an advantage, and there was a sense of unfairness among the players.

Here, in the service system 1 constituted by the charging station device 200 and the management server 300 in the second embodiment, instead of the positional information of the mobile information terminal GNSS receiving part 430 of the mobile information terminal 400, the management server 300 generates the personalized information and transmits the personalized information to the game information providing server 600 on the basis of the battery information of the returned detachable battery 100, and the game information providing server 600 outputs the game information that displays the information related to at least one of the item, the character and the event of the location-based game to the mobile information terminal 400 on the basis of the received personalized information. Accordingly, since the game element based on the positional information in the location-based game is limited within an action range of the charging station device 200, it is possible to realize the location-based game that is fairer and in which the game property is more improved. In addition, it is possible to create a specific position in the game world which has an extra value other than monetary value. In addition, it is possible to improve satisfaction of the user by adding the pleasure of the location-based game to a battery exchange work that is a burden for the user.

Third Embodiment

Figure 23:
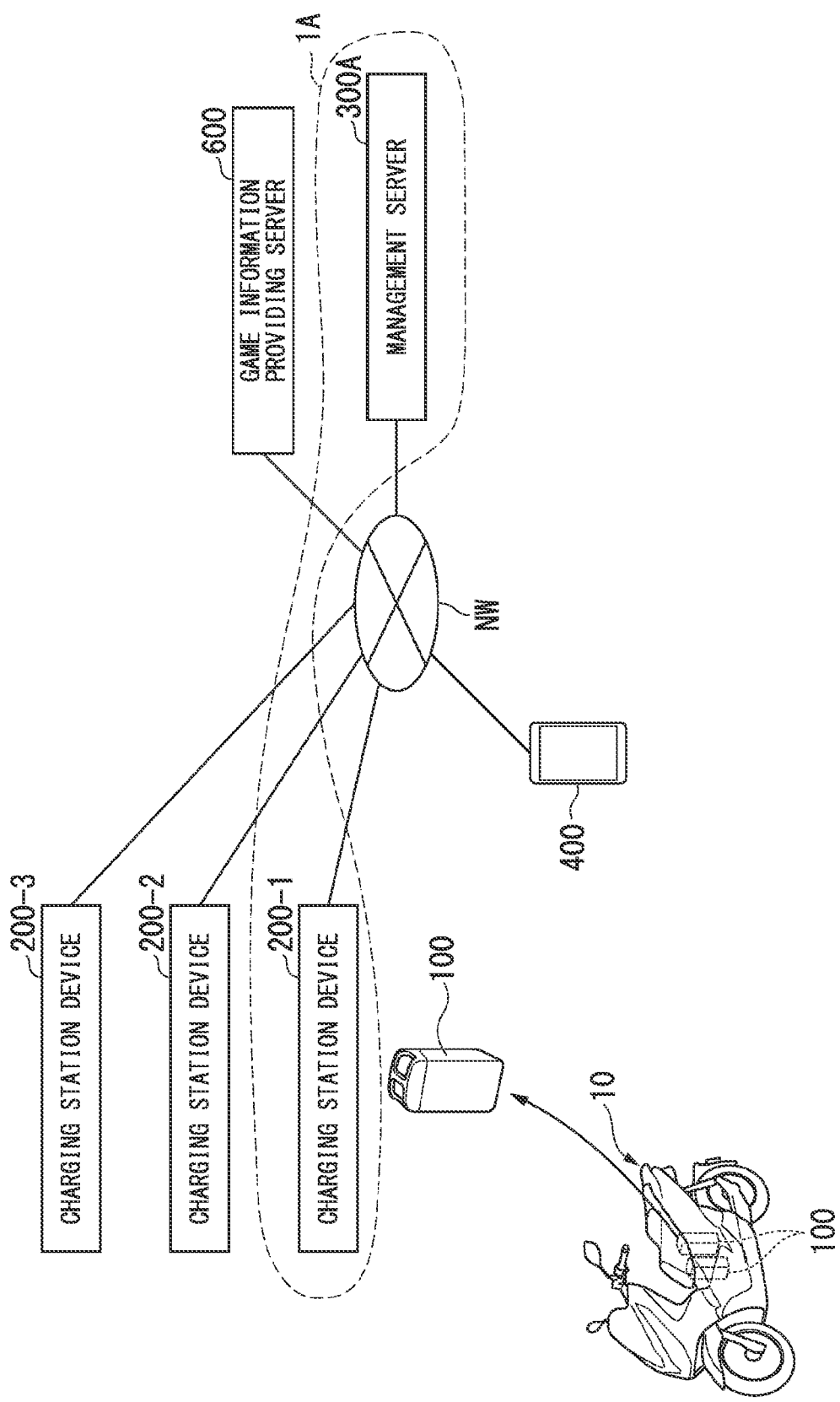
FIG. 23 is a configuration view showing an example of a service system constituted by a charging station device and a management server according to a third embodiment as a whole.

FIG. 23 is a configuration view showing an example of the service system 1 constituted by a charging station devices 200-1 and a management server 300A according to a third embodiment as a whole. FIG. 23 also shows the electrically driven vehicle 10, the detachable battery 100, charging station devices 200-2 to 3, and the mobile information terminal 400, which use the battery sharing service.

Figure 24:
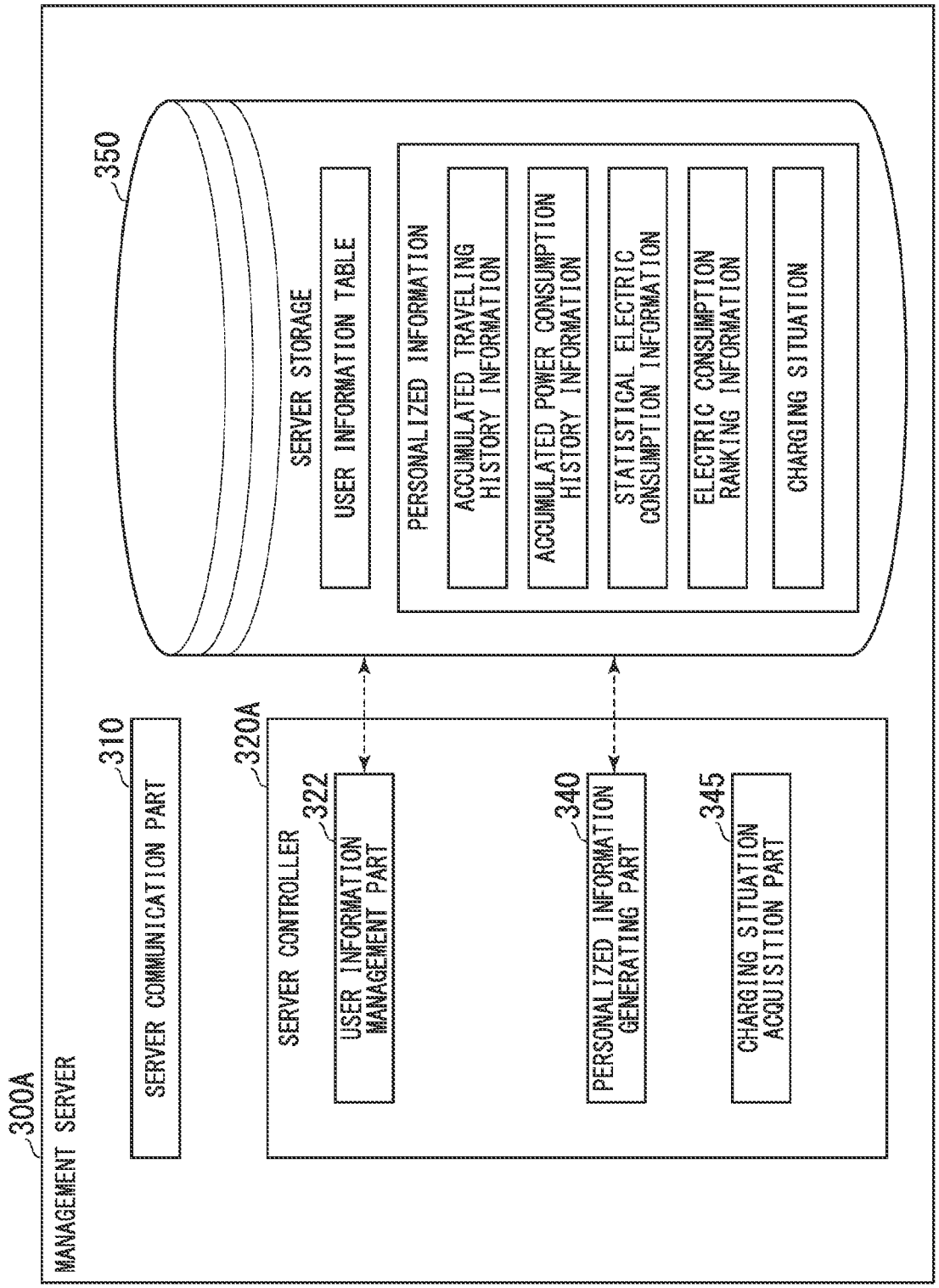
FIG. 24 is a view showing an example of a configuration of a management server according to the third embodiment.

FIG. 24 is a view showing an example of a configuration of the management server 300A according to the third embodiment. While the charging station devices 200-1 to 200-3 and the management server 300A according to the third embodiment have the same configurations as the charging station device 200 and the management server 300 according to the first embodiment, in the third embodiment, the server controller 320A of the management server 300A further includes a charging situation acquisition part 345. While the plurality of charging station devices 200-1 to 200-3 are shown in FIG. 23, hereinafter, when the plurality of charging station devices 200-1 to 200-3 are not individually discriminated, they may be simply referred to as the charging station devices 200.

The charging situation acquisition part 345 acquires a charging situation of the battery 100 during charging in another charging device via the network NW. For example, the charging situation acquisition part 345 may acquire an average SOC of the plurality of detachable batteries 100 accommodated in the plurality of charging station devices 200-1 to 200-3, respectively, or may acquire an SOC of all the detachable batteries 100 accommodated in the plurality of charging station devices 200-1 to 200-3, respectively, as a charging situation.

For example, the personalized information generation part 340 generates the personalized information such that at least one of a type, contents, an appearance ratio, and an attribute with respect to at least one of the item, the character and the event of the location-based game is determined on the basis of the acquired charging situation. Then, like the second embodiment, the game information providing server 600 generates game information on the basis of the received personalized information and transmits the game information to the mobile information terminal. Application of the location-based game running in the mobile information terminal 400 performs display according to the received game information.

It is conceivable that, when the frequency of use of the plurality of charging station devices 200-1 to 200-3 is uneven and the frequency of use of a specific charging station device 200 increases, the charging of the returned detachable battery 100 can not catch up with the user's use, and in such charging station device 200, the SOC of all of the detachable batteries 100 gets low. In such a case, in the charging station devices 200 in which a frequency of use is lower, the large number of detachable batteries 100 with a high SOC level are accommodated, and an average SOC (an average charging rate) is high, it is possible to guide the user to such charging station device 200 having a high average SOC (average charging rate) by generating at least one of a popular item, character and event with a high scarcity value of the above-mentioned location-based game in such charging station device 200. Accordingly, it is possible to improve the problem of insufficient charging that tends to occur in such a battery sharing service at the charging station device 200 which the user uses with a high frequency. By awarding at least one of the popular item, character and event with a high scarcity value to the user, it is possible to guide the user to use the charging station device 200 being used with a low frequency, and to suppress the problem of bias in the frequency of the usage among the plurality of charging station devices 200.

For example, the personalized information generation part 340 generates personalized information so as to determine at least one of the type, the contents, the appearance ratio and the attribute with respect to at least one of the item, the character and the event of the above mentioned game such that the user, who has high possibility to pass through the vicinity of the charging station device 200 having a high average SOC (average charging rate) of the accommodated batteries 100, is guided to such charging station device 200 with such high average SOC, on the basis of the accumulated traveling history information, in which traveling history information of the plurality of electrically driven vehicles 10 is accumulated, and the charging situation. For example, in the case of a monster collecting game exemplified in FIG. 21, it is possible to generate a popular monster with a high scarcity value near the charging station device 200 having a high average SOC with respect to a user who has a high possibility to pass the vicinity of the charging station device 200 with such high average SOC, or it is possible to distribute popular items with a high scarcity value at item distribution stations near the charging station device 200 having a high average SOC, on the basis of the accumulated traveling history information.

In the service system 1 of the third embodiment, the management server 300A includes the charging situation acquisition part 345. Since the charging situation acquisition part 345 acquires a charging situation of the detachable battery 100 during charging in another charging device, and the personalized information generation part 340 generates personalized information so as to determine at least one of the type, the contents, the appearance ratio and the attribute with respect to at least one of the item, the character and the event of the location-based game on the basis of the charging situation acquired by the charging situation acquisition part 345, it is possible to consciously operate the user's action and realize congestion reduction of the charging station devices 200, or realize leveling of the SOC of the detachable batteries 100 accommodated in the charging station devices 200.

Fourth Embodiment

Figure 25:
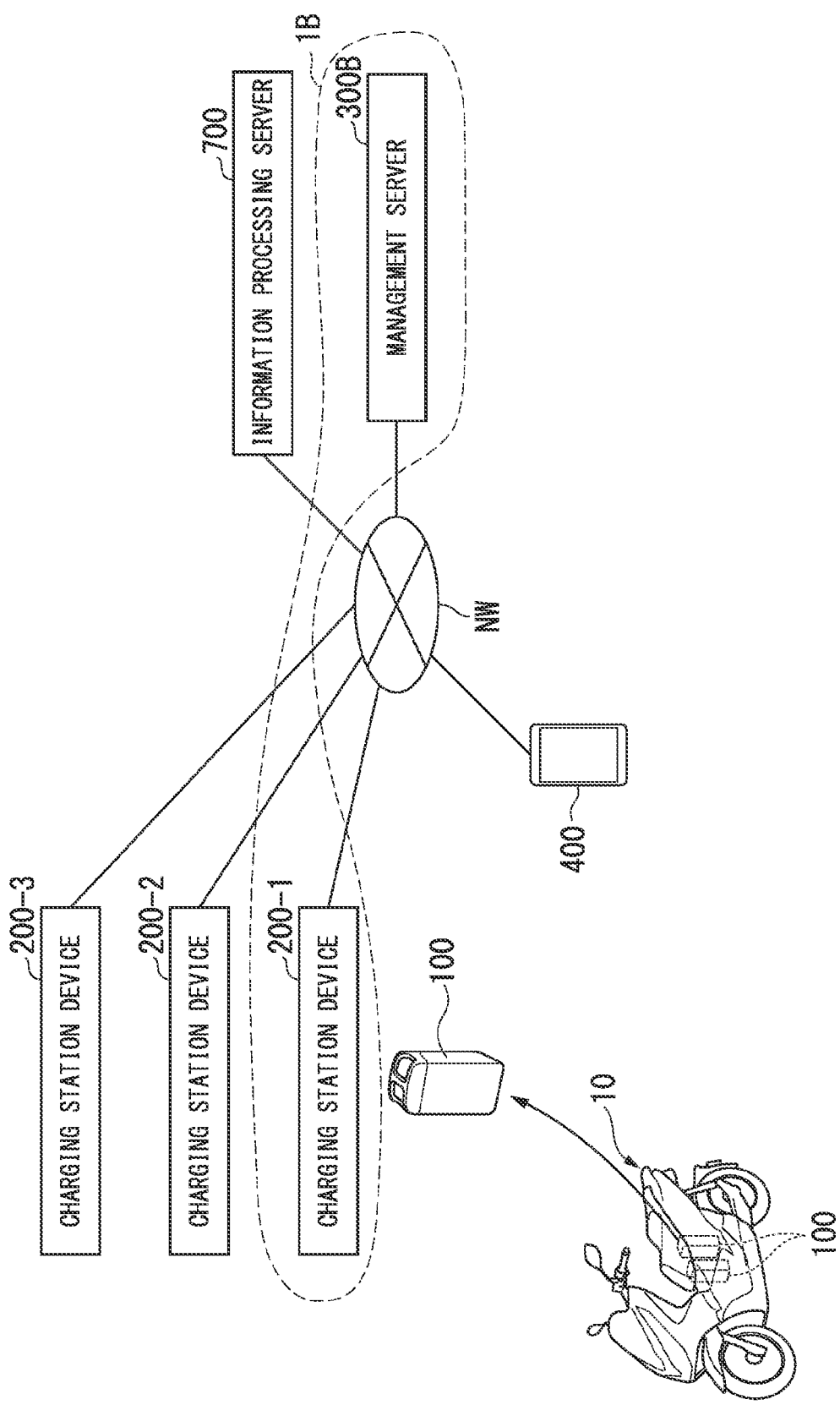
FIG. 25 is a configuration view showing an example of a service system constituted by a charging station device and a management server according to a fourth embodiment as a whole.

FIG. 25 is a configuration view showing an example of the service system 1 constituted by a charging station device 200-1 and a management server 300B according to a fourth embodiment. FIG. 25 also shows the electrically driven vehicle 10, the detachable battery 100, the mobile information terminal 400, charging station devices 200-2 to 3, and an information processing server 700, which use a battery sharing service.

Figure 26:
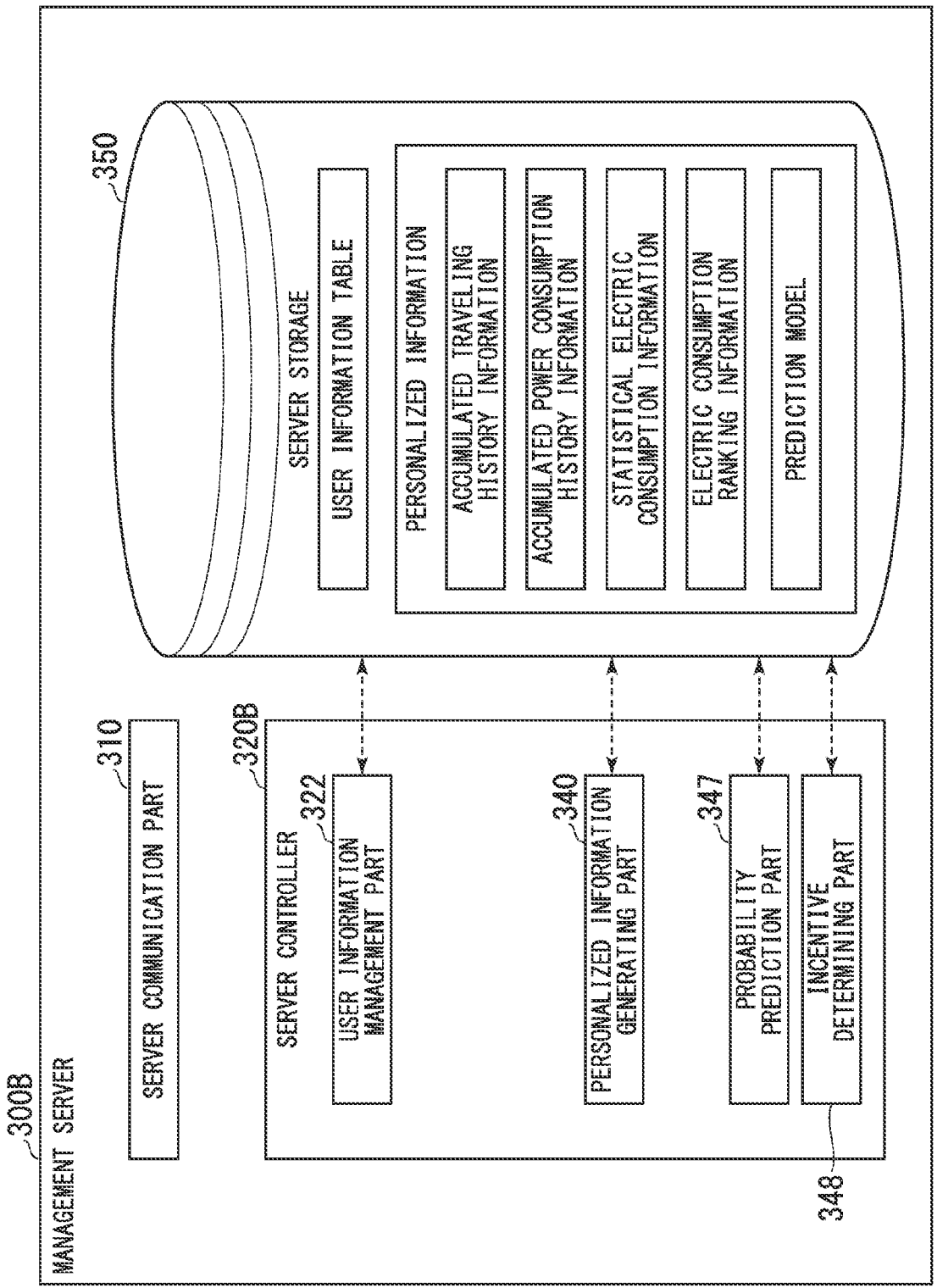
FIG. 26 is a view showing an example of a configuration of a management server.

FIG. 26 is a view showing an example of a configuration of the management server 300B. While the charging station devices 200 and the management server 300B according to the fourth embodiment have the same configurations as the charging station devices 200 and the management server 300 according to the first embodiment, in the fourth embodiment, a server controller 320B of the management server 300B further includes a probability prediction part 347 and an incentive determining part 348. The probability prediction part 347 and the incentive determining part 348 are realized by executing a program (software) using a hardware processor such as a CPU or the like. In addition, some or all of the functions may be realized by hardware such as an LSI, an ASIC, an FPGA, a GPU, or the like, or may be realized by cooperation of software and hardware. For example, an incentive (an example of personalized information) is generated on the basis of the probability information derived by the probability prediction part 347. The probability prediction part 347 and the incentive determining part 348 will be described below.

In the service system 1 of the fourth embodiment, the charging station device 200 provides the incentive as the personalized information. The incentive is, for example, a coupon usable to purchase goods or a service (hereinafter, referred to as an item) sold in shopping or the like at free of charge or a discounted price. In addition, the incentive may be a point, a ticket, a discount ticket, or the like, that have the same effect as the coupon, or may be a right that can preferentially purchase a specific item (a first several people-limited purchase right) or the like. In the embodiment, as an example, the incentive as a coupon usable to purchase the item at free of charge or a discounted price will be described.

The coupon may be displayed on a display part 25 as a matrix type two-dimensional code such as a QR code (registered trademark) or the like, a stack type two-dimensional code, or a one-dimensional code, and the user 5 may acquire a two-dimensional code or a one-dimensional code of the displayed coupon by imaging the code using the camera 480.

Figure 27:
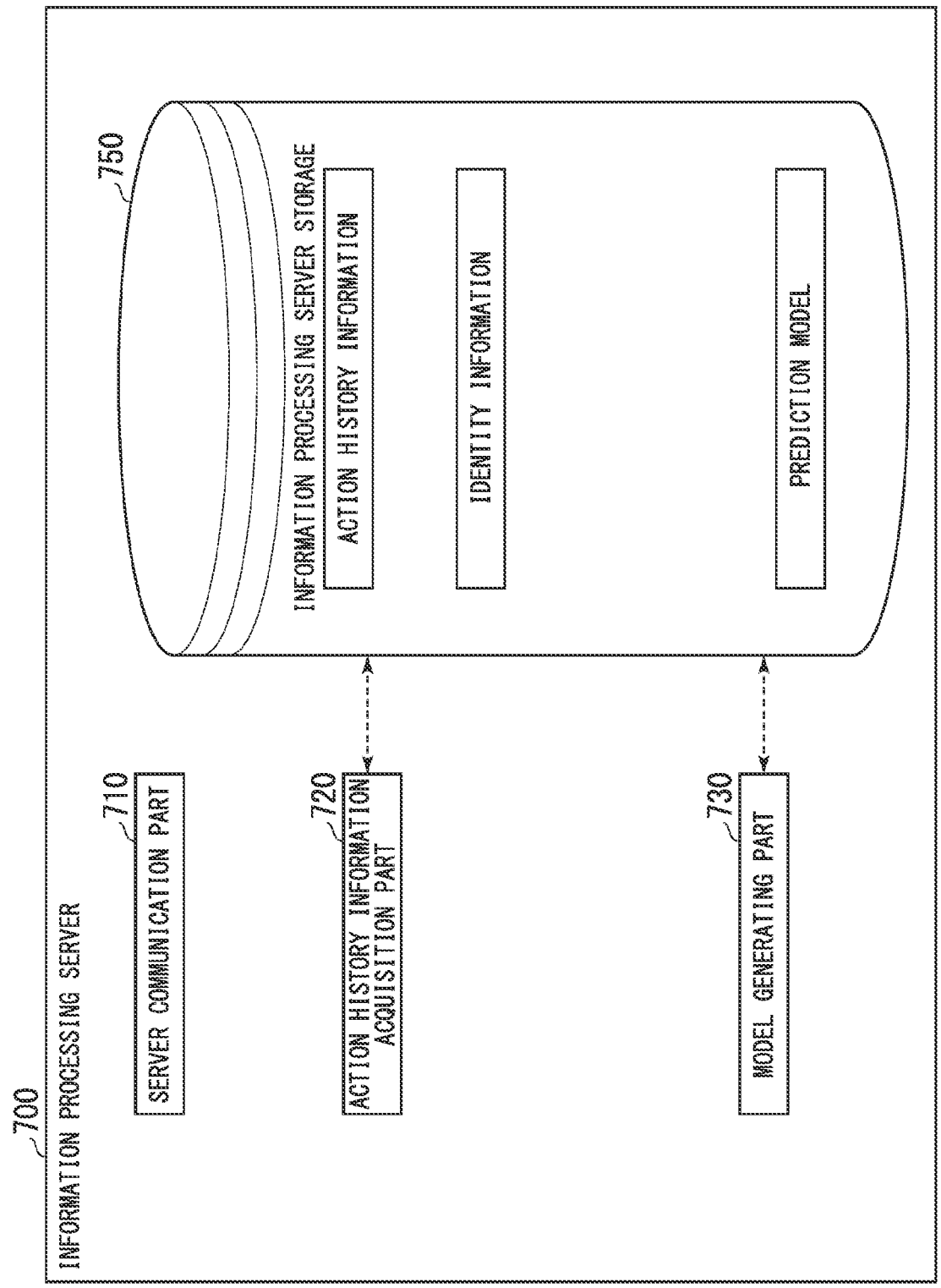
FIG. 27 is a view showing an example of a configuration of an information processing server.

FIG. 27 is a view showing an example of a configuration of the information processing server 700. The information processing server 700 includes, for example, an information processing server communication part 710, an information processing server information acquisition part 720, a model generating part 730, and an information processing server storage 750. The information processing server information acquisition part 720 and the model generating part 730 are realized by executing a program (software) using a hardware processor such as a CPU or the like. In addition, some or all of the functions may be realized by an LSI, an ASIC, an FPGA, a GPU, or the like, or may be realized by cooperation of software and hardware.

The information processing server communication part 710 includes a wired communication device such as a terminal adaptor, an Ethernet (registered trademark) communication device, or the like, or a cellular communication device such as a Wi-Fi adaptor, 3G/LTE, or the like, and communicates with the management server 300B, the mobile information terminal 400, and the like, via the network NW.

FIG. 28 is a view showing an example of contents of action history information. The action history information is information to which information indicating whether the user uses the incentive (coupon) within a predetermined period (for example, an effective period of the coupon) to reach a predetermined action (for example, purchase or the like of the item) corresponds, when a plurality of types of incentives (coupons) are applied to the user with respect to the user ID that can identify each user. In the example shown, in the action history information, purchasing the items in the plurality of stores is treated as the predetermined action, the information referred to as "purchased" is associated when the item sold in the store is purchased (or free-exchanged), and the information referred to as "not purchased" is associated when the item is not purchased (or free-exchanged).

The predetermined action is an action that an issuer of incentives (coupons) expects from the user. For example, when the issuer of the incentives (coupons) is a supermarket, the predetermined action is to purchase the items sold in the supermarket.

The information processing server information acquisition part 720 acquires, for example, action history information and identity information as shown via the network NW. For example, a coupon ID is given to each coupon issued by the charging station device 200, and when the coupon is actually used, a payment system of each store notifies a coupon management server (not shown) of the user ID and the coupon ID. In this way, the action history information can be acquired by aggregating the information accumulated in the coupon management server. The information processing server information acquisition part 720 stores the acquired action history information in the information processing server storage 750.

The identity information is, for example, user information with respect to the user ID shown in FIG. 8, and information in association with the battery information such as accumulated traveling history information or the like as shown in FIG. 9. The information processing server information acquisition part 720 generates identity information from the information stored in the server storage 350 and stores the identity information in the information processing server storage 750.

The model generating part 730 generates a prediction model configured to derive a purchase probability that the user purchases each item from the action history information and the identity information. The model generating part 730 sets, for example, a feature vector indicating an identity of the user who purchased the item after the coupon is issued as a positive example and a feature vector indicating the identity of the user who did not purchase the item after the coupon is issued as a negative example, and derives a function representing a hyper plane that separates the positive example and the negative example in a feature space using a support vector machine (SVM) as a prediction model.

For example, in the plurality of user's identities included in the identity information, about a half of user's identities are treated as instructor data (correct answer data) in the SVM, and the remaining user's identities are treated as learning data. The instructor data are data from which the above-mentioned hyper plane is derived, and the learning data are data of an object that is classified as one of the positive example and negative example by the hyper plane derived by the instructor data.

For example, the model generating part 730 generates a prediction model with respect to an issue of each coupon (a function indicating a hyper plane) by deriving the hyper plane configured to separate the positive example and the negative example from the identity of the user in the issue of each coupon.

Here, the model generating part 730 derives a hyper plane such that a proportion between the positive examples and the negative examples of the learning data is similar to a proportion between the positive examples and the negative examples of the instructor data (preferably, the same proportion).

Then, the model generating part 730 classifies the identity of the user that is learning data as any one of the positive example and the negative example according to the prediction model at the issue of each coupon generated using the instructor data, derives a score of each of the classified identities, and stores the derived score in the information processing server storage 750. The score disclosed herein is, for example, information in which a distance between the hyper plane derived as the prediction model and the feature vector indicating the identity is expressed in a numerical form.

The prediction model configured to derive a purchase probability in which the user purchases each item is not limited to generate a hyper plane that classifies it as any one of the positive example and the negative example using the SVM, or may generate a prediction model using logistic regression analysis, multiple regression analysis, or the like.

The information processing server storage 750 stores, for example, action history information, identity information, a prediction model, and the like.

The prediction model generated by the information processing server 700 and stored in the information processing server storage 750 is transmitted to the management server 300B via the network NW and stored in the server storage 350. Generation of the prediction model and the score by the information processing server 700 may be periodically performed or may be performed according to requirements from the management server 300B.

In the management server 300B, the probability prediction part 347 derives an action probability that is a probability reaching the predetermined action (for example, an action expected with respect to the user 5 by an issuer of an incentive) and stores the action probability in the server storage 350 when the user 5 was given an incentive by applying the user information and the battery information of the user 5 to the prediction model. The probability prediction part 347 can derive, for example, the action probability of the user 5 by substituting the score derived by the prediction model into the probability density function such as a sigmoid function.

The incentive determining part 348 determines an incentive given to the user 5 on the basis of the action probability predicted by the probability prediction part 347. For example, the incentive may be determined to maximize the revenue received from the issuer of the incentive to the extent that the incentive can be given. The incentive determining part 348 is an example of the determining part.

The personalized information generation part 340 generates personalized information including the incentive determined by the incentive determining part 348, performs communication with the charging station device 200 via the server communication part 310, transmits the generated personalized information to the charging station device 200, and stores the personalized information in the charging station storage 280 of the charging station device 200. The personalized information providing part 270 of the charging station device 200 displays the personalized information stored in the charging station storage 280 on the display 230. The user 5 images the two-dimensional code or the one-dimensional code of the coupon included in the personalized information displayed on the display 230 using the camera 480 and uses the coupon through the predetermined application.

Hereinabove, while the two-dimensional code or the one-dimensional code of the coupon is displayed on the display 230, the two-dimensional code or the one-dimensional code of the coupon may be printed by a printer (not shown) provided in the charging station device 200, the user 5 may acquire a paper coupon on which the two-dimensional code or the one-dimensional code is printed, and the paper coupon may be read by a reader of the payment system of the store.

While the personalized information including the coupon is transmitted to the charging station device 200 in the service system 1 of the fourth embodiment, the personalized information including the coupon may be directly transmitted to the mobile information terminal 400 of the user 5 via the network NW. Alternatively, the information including the coupon may be directly transmitted to the server of the payment system of the store that is the issuer of the coupon, a message indicating that a coupon usable in the store is given to the user 5 may be displayed on the display 230 to notify the user 5, or a message displayed on the mobile information terminal 400 may be used to notify the user 5.

Hereinabove, an example in which the incentive (coupon) is included in the personalized information has been described. However, the configuration of the fourth embodiment can be applied to various types of personalized information. For example, after the personalized information that is the information based on the battery information is displayed on the display 230, when a survey indicating that "was this information helpful?" is displayed and an answer of "helpful" (a positive example) or "not helpful" (a negative example) is received from the user 5, the instructor data in which the displayed personalized information is classified into the positive example and the negative example can be prepared, and the information processing server 700 can derive a function representing a hyper plane that separates the positive example and the negative example in the feature space as a prediction model. A method of classifying the personalized information into the positive example and the negative example is not limited to use the survey that "was the information helpful?," and in the case in which the time when the user gaze at the screen is measured by a visual line sensor (not shown) or the personalized information is displayed on the mobile information terminal, the time until the transition to the next screen is measured, it is estimated that the displayed personalized information was useful, and thus, the information processing server 700 can be derived as a prediction model by the same method. Accordingly, the configuration of the fourth embodiment can also be applied to the personalized information described in each embodiment.

[Variant]

In the above-mentioned embodiment, the management server 300 generates personalized information, and the charging station device 200 displays the generated personalized information on the display 230. However, the generated personalized information may be transmitted to the mobile information terminal 400 and displayed on the input/output part 420. For example, the management server 300 can transmit the personalized information to the mobile information terminal 400 as a notification by push transmission.

In the above-mentioned embodiment, it is assumed that the management server 300 generates personalized information and the charging station device 200 generates it. However, the functions of the server controller 320 and the charging station controller 260 may be implemented on the charging station device 200, and the charging station device 200 may generate personalized information. In addition, some of all of the functions of the server controller 320 and the charging station controller 260 may be implemented on the mobile information terminal 400, and the mobile information terminal 400 may generate personalized information. In addition, the functions of the server controller 320 may be distributed and implemented in a plurality of servers instead of one server.

In the above-mentioned embodiment, when the connecting section 150 of the detachable battery 100 and the charging station connecting section 224 of the charging station device 200 are connected in a wired manner, the detachable battery 100 is charged. However, the detachable battery 100 may be charged through non-contact charging.

In the above-mentioned embodiment, data communication between the detachable battery 100 and the vehicle controller 14 is performed through serial communication. However, data communication between the detachable battery 100 and the vehicle controller 14 may be another wired communication type such as parallel communication, wired LAN, or the like, or an arbitrary communication type such as wireless LAN (Wi-Fi), Bluetooth (registered trademark), near field communication (NFC), or the like.

In the above-mentioned embodiment, the detachable battery 100 includes the BMU 110 and the measurement sensor 130. However, the detachable battery 100 may include any one or more of the BMU 110 and the measurement sensor 130. For example, the electrically driven vehicle 10 may communicate with the storage 140 included in the detachable battery 100 via the battery connecting section 12, and the electrically driven vehicle 10 may realize a function corresponding to at least one or more of the BMU 110 and the measurement sensor 130 of the above-mentioned embodiment.

The above-mentioned embodiments and variants are not exclusive to each other and can be combined with each other. For example, the location-based game of the third embodiment and the incentive of the fourth embodiment can be combined. For example, in the location-based game, a coupon usable in the actual store can be given, and the configurations obtained by combining the plurality of embodiments and variants are also included in the present invention.

(A1) In one embodiment, the information generation device includes the information acquisition part (for example, the battery information acquisition part 264, the user information management part 322) configured to acquire personal information (for example, battery information, user information) of a user who uses the battery module (for example, the battery module 100), and the information generation part (for example, the personalized information generation part 340) configured to generate personalized information on the basis of the personal information acquired by the information acquisition part. The battery module is detachably attached to the electric power device (for example, the electrically driven vehicle 10) that uses electric power. The personalized information is provided to, for example, the user. In one example, the information acquisition part is the battery information acquisition 264 in the charging station devices 200, or the user information management part 322 in the management server 300. In another example, another device such as the mobile information terminal 400 may have the information acquisition part. In one example, the information generation part is the personalized information generation part 340 in the management server 300. In another example, another device such as the charging station devices 200, the mobile information terminal 400, or the like, may have the information generation part.

(A2) In the above mentioned information generation device, the information acquisition part may acquire the personal positional information that is at least one of the first positional information, the second positional information, and the third positional information as the personal information. The first positional information is the positional information of the battery module which the user is using. For example, the first positional information corresponds to the positional information of the electric power device (for example, the electrically driven vehicle 10), to which the battery module currently used by the user is attached. The second positional information is the positional information of the battery module which the user has used. For example, the second positional information is the positional information of the battery module used by the user in the past and corresponds to the movement history information (for example, traveling history information). The third positional information is the predicted positional information of the battery module which will be used by the user. For example, the third positional information is the predicted positional information of the battery module used by the user in the future and corresponds to the activity range information of the user.

(A3) In the above mentioned information generation device disclosed in any one of the above-mentioned aspects, the information acquisition part may acquire the personal positional information that is at least one of the fourth positional information, the fifth positional information, and the sixth positional information as the personal information. The fourth positional information is the positional information of the storage device which the user is using among the storage device (for example, a part of the charging station device 200) in which a battery module that is exchangeable with the battery module is stored. For example, the fourth positional information relates to the storage device currently used by the user. The fifth positional information is the positional information of the storage device which the user has used. For example, the fifth positional information relates to the storage device used by the user in the past. The sixth positional information is the positional information of the storage device which will be used by the user. For example, the sixth positional information relates to the storage device used by the user in the future.

(A4) In the above mentioned information generation device disclosed in any one of the above-mentioned aspects, the information generation part may generate at least one of the information, the advertisement, and the incentive regarding at least one of the facilities (for example, shops, commercial facilities, and the like) present near the personal positional information and events held near the personal positional information, as the personalized information. For example, the information generation part generates the personalized information on the basis of the personal positional information acquired by the information acquisition part.

(A5) In the above mentioned information generation device disclosed in any one of the above-mentioned aspects, the information generation part may generate at least one of the weather information and the traffic information regarding the region that includes the personal positional information, as the personalized information. The traffic information includes, for example, the congestion information, the traffic safety information, and the driving advice. The information generation part generates, for example, the personalized information on the basis of the personal positional information acquired by the information acquisition part.

(A6) In the above mentioned information generation device disclosed in any one of the above-mentioned aspects, the information acquisition part may acquire the attachment counterpart information as the personal information, the attachment counterpart information being at least one of the information regarding the electric power device, to which the battery module which the user is using is attached and the information regarding the electric power device, to which the battery module which the user has used was attached. For example, the information regarding the electric power device relates to the electric power device, to which the battery module currently used by the user is attached. Alternatively, the information regarding the electric power device relates to the electric power device, to which the battery module used by the user in the past is attached. In addition, the information generation part may generate at least one of the maintenance information, the insurance information, and the purchase support information with respect to the electric power device as the personalized information. The maintenance information includes information related to, for example, automobile inspection/repair, or the like. The purchase support information includes, for example, information related to a loan or the like. For example, the information generation part generates the personalized information on the basis of the attachment counterpart information acquired by the information acquisition part.

(A7) In the above mentioned information generation device disclosed in any one of the above-mentioned aspects, the electric power device may be a moving body that is movable using electric power of the battery module. In addition, the information acquisition part may acquire information regarding the electric power consumption when the user has used the moving body, as the personal information. The information related to the electric power consumption relates to information such as an electric power consumption rate, an electric power consumption amount, or the like.

(A8) In the above mentioned information generation device disclosed in any one of the above-mentioned aspects, the information generation part may generate relative ranking information of the user (related to the electric power consumption) which is obtained on the basis of the information related to the electric power consumption of a plurality of users, as the personalized information. For example, the relative ranking information relates to the electric power consumption of the user.

(A9) In the above mentioned information generation device disclosed in any one of the above-mentioned aspects, the information generation part may generate recommendation information regarding at least one of the next charging of the battery module and the next exchange of the battery module with other battery module on the basis of the information related to the electric power consumption of the user, as the personalized information. The information related to the electric power consumption is acquired by, for example, the information acquisition part.

(A10) In the above mentioned information generation device disclosed in any one of the above-mentioned aspects, the sixth positional information may be obtained on the basis of at least one of the fourth positional information and the fifth positional information.

(A11) In the above mentioned information generation device disclosed in any one of the above-mentioned aspects, the information generation part may generate recommendation information regarding the storage device which the user will use next on the basis of the sixth positional information as the personalized information. The sixth positional information is acquired by, for example, the information acquisition part.

(A12) In the above mentioned information generation device disclosed in any one of the above-mentioned aspects, the third positional information may be obtained on the basis of at least one of the first positional information and the second positional information.

(A13) In the above mentioned information generation device disclosed in any one of the above-mentioned aspects, the personalized information may be the incentive. In this case, the information generation part generates, for example, the personalized information on the basis of the probability information derived by the probability prediction part configured to derive a probability that the user will use the incentive when the incentive is given to the user.

(A14) In the above mentioned information generation device disclosed in any one of the above-mentioned aspects, the information acquisition part may acquire the personal information on the basis of memory information of the storage (for example, the storage 140) that is provided on the battery module and that is configured to store use aspects (a use state, a use history) of the battery module in a state the battery module is attached to the electric power device. For example, the personal information is personal information of the user.

(A15) In the above mentioned information generation device disclosed in any one of the above-mentioned aspects, the memory information of the storage may be output to other storage (for example, the charging station storage 280) provided on the storage device (for example, a part of the charging station device 200) configured to store a battery module that is exchangeable with the battery module. In addition, the information acquisition part may acquire the personal information on the basis of the memory information stored in the other storage. For example, the personal information is personal information of the user.

(A16) In the above mentioned information generation device disclosed in any one of the above-mentioned aspects, the information acquisition part may acquire the personal information on the basis of the input information of the user. For example, the personal information is personal information of the user.

(A17) In the above mentioned information generation device disclosed in any one of the above-mentioned aspects, the information generation device may further include the communication parts (for example, the charging station communication part 250, the server communication part 310, the WAN wireless communication part 450, the near field wireless communication part 460, and the information processing server communication part 710). The communication part may transmit the personalized information generated by the information generation part to a portable terminal carried by the user. Alternatively and/or additionally, the communication part may transmit the personalized information to the storage device (for example, a part of the charging station device 200) configured to store a battery module that is exchangeable with the battery module.

(A18) In the above mentioned information generation device disclosed in any one of the above-mentioned aspects, the information generation part may generate game information (game setting information) as the personalized information, the game information being at least one of the item, the character, and the event regarding the game provided to the game application on the basis of the personal information acquired by the information acquisition part.

(A19) In the above mentioned information generation device disclosed in any one of the above-mentioned aspects, the information generation part may generate the personalized information such that at least one of the type, the contents, the appearance ratio, and the attribute of the game information (game setting information) is determined on the basis of at least one of the personal information and the other parameters.

(A20) In the above mentioned information generation device disclosed in any one of the above-mentioned aspects, the other parameters may include at least one of a charging situation of the battery module in the plurality of storage devices configured to store battery modules that are exchangeable with the battery module, and an accumulated use history of the plurality of electric power devices, and an action history of the plurality of users.

Hereinabove, while the aspects for implementing the present invention have been described using the embodiments, the present invention is not particularly limited to the above-mentioned embodiments, and various modifications and substitutions may be made without departing from the scope of the present invention.

REFERENCE SIGNS LIST

1 Service system
5 User
10 Electrically driven vehicle
12 Battery connecting section
14 Vehicle controller
16 Traveling driving force output device
18 Vehicle sensor
22 Electrically driven vehicle GNSS receiving part
100 Battery module (detachable battery)
120 Electricity accumulation part
130 Measurement sensor
140 Storage
150 Connecting section
180 Battery control device
200 Charging device
200 Charging station device
220 Charging module
221 Slot section
221L Lower stage slot
221U Upper stage slot
224 Charging station connecting section
226 Charger
230 Display
240 Authentication device
250 Charging station communication part
260 Charging station controller
262 Charging controller
264 Battery information acquisition part
270 Personalized information providing part
280 Charging station storage
300 Management server
310 Server communication part
320, 320A, 320B Server controller
322 User information management part
340 Personalized information generation part
345 Charging situation acquisition part
347 Probability prediction part
348 Incentive determining part
350 Server storage
400 Mobile information terminal
410 Controller
420 Input/output part
430 Mobile information terminal GNSS receiving part
440 Acceleration detecting part
450 WAN wireless communication part
460 Near field wireless communication part
470 Microphone
480 Camera
490 Speaker
500 Storage
600 Game information providing server
700 Information processing server
710 Information processing server communication part
720 Information processing server information acquisition part
730 Model generating part
750 Information processing server storage

What is claim is:

1. An information generation device comprising:
an information acquisition part configured to acquire personal information of a user who uses a battery module which is detachably attached to an electric power device that uses electric power; and
an information generation part configured to generate personalized information on the basis of the personal information acquired by the information acquisition part, wherein the personalized information is specific for the user, wherein the information acquisition part acquires personal positional information as the personal information, the personal positional information being at least one of first positional information that is positional information of the battery module which the user is using, second positional information that is positional information of the battery module which the user has used, and third positional information that is predicted positional information of the battery module which will be used by the user, and wherein the information generation part generates the personalized information on the basis of the personal positional information which is at least one of the first positional information, the second positional information, and the third positional information acquired by the information acquisition part.

2. The information generation device according to claim 1, wherein the information generation part generates at least one of weather information and traffic information regarding a region that includes the personal positional information, as the personalized information.

3. The information generation device according to claim 1, wherein the electric power device is a moving body that is movable using electric power of the battery module, and the information acquisition part acquires information regarding electric power consumption when the user has used the moving body, as the personal information.

4. The information generation device according to claim 3, wherein the information generation part generates relative ranking information of the user which is obtained on the basis of the information related to the electric power consumption of a plurality of users, as the personalized information.

5. The information generation device according to claim 3, wherein the information generation part generates recommendation information regarding at least one of the next charging of the battery module and the next exchange of the battery module with other battery module on the basis of the information related to the electric power consumption of the user, as the personalized information.

6. The information generation device according to claim 1, wherein the third positional information is obtained on the basis of at least one of the first positional information and the second positional information.

7. The information generation device according to claim 1, wherein the information acquisition part acquires the personal information on the basis of memory information of a storage that is provided on the battery module and that is configured to store a use aspect of the battery module in a state the battery module is attached to the electric power device.

8. The information generation device according to claim 7, wherein the memory information of the storage is output to other storage provided on a storage device configured to store a battery module that is exchangeable with the battery module, and the information acquisition part acquires the personal information on the basis of the memory information stored in the other storage.

9. The information generation device according to claim 1, wherein the information acquisition part acquires the personal information on the basis of input information of the user.

10. The information generation device according to claim 1, further comprising a communication part configured to transmit the personalized information generated by the information generation part to at least one of a portable terminal which the user carries and a storage device configured to store a battery module that is exchangeable with the battery module.

11. The information generation device according to claim 1, wherein the information generation part generates game information as the personalized information, the game information being at least one of an item, a character, and an event regarding a game provided to an application of the game on the basis of the personal information acquired by the information acquisition part.

12. The information generation device according to claim 11, wherein the information generation part generates the personalized information such that at least one of a type, contents, an appearance ratio, and an attribute of the game information is determined on the basis of at least one of the personal information and other parameter.

13. The information generation device according to claim 12, wherein the other parameters include at least one of a charging situation of a battery module in a plurality of storage devices configured to store a battery module that is exchangeable with the battery module, an accumulated use history of the plurality of electric power devices, and an action history of the plurality of users.

14. An information generation method comprising:
acquiring personal information of a user who uses a battery module detachably attached to an electric power device that uses electric power; and
generating personalized information on the basis of the acquired personal information, wherein the personalized information is specific for the user,
wherein the acquiring comprises acquiring personal positional information as the personal information, the personal positional information being at least one of first positional information that is positional information of the battery module which the user is using, second positional information that is positional information of the battery module which the user has used, and third positional information that is predicted positional information of the battery module which will be used by the user, and
wherein the generating comprises generating the personalized information on the basis of the personal positional information which is at least one of the first positional information, the second positional information, and the third positional information acquired during the acquiring.

15. A computer-readable non-transitory recording medium in which a program is stored, the program configured to cause a computer to execute:
a step of acquiring personal information of a user who uses a battery module detachably attached to an electric power device that uses electric power; and
a step of generating personalized information on the basis of the acquired personal information, wherein the personalized information is specific for the user,
wherein the step of acquiring comprises acquiring personal positional information as the personal information, the personal positional information being at least one of first positional information that is positional information of the battery module which the user is using, second positional information that is positional information of the battery module which the user has used, and third positional information that is predicted positional information of the battery module which will be used by the user, and
wherein the step of generating comprises generating the personalized information on the basis of the personal positional information which is at least one of the first positional information, the second positional information, and the third positional information acquired during the acquiring.

16. An information generation device comprising:
an information acquisition part configured to acquire personal information of a user who uses a battery module which is detachably attached to an electric power device that uses electric power; and
an information generation part configured to generate personalized information on the basis of the personal information acquired by the information acquisition part, wherein the personalized information is specific for the user,
wherein the information acquisition part acquires personal positional information as the personal information, the personal positional information being at least one of fourth positional information that is positional information of a storage device which the user is using among storage devices configured to store a battery module that is exchangeable with the battery module, fifth positional information that is positional information of a storage device which the user has used among the storage devices, and sixth positional information that is positional information of a storage device which will be used by the user among the storage devices, and
wherein the information generation part generates the personalized information on the basis of the personal positional information which is at least one of the fourth positional information, the fifth positional information, and the sixth positional information acquired by the information acquisition part.

17. An information generation device comprising:
an information acquisition part configured to acquire personal information of a user who uses a battery module which is detachably attached to an electric power device that uses electric power; and
an information generation part configured to generate personalized information on the basis of the personal information acquired by the information acquisition part, wherein the personalized information is specific for the user,
wherein the information acquisition part acquires personal positional information as the personal information, the personal positional information being at least one of first positional information that is positional information of the battery module which the user is using, second positional information that is positional information of the battery module which the user has used, and third positional information that is predicted positional information of the battery module which will be used by the user, or wherein the information acquisition part acquires personal positional information, the personal positional information being at least one of fourth positional information that is positional information of a storage device which the user is using among storage devices configured to store a battery module that is exchangeable with the battery module, fifth positional information that is positional information of a storage device which the user has used among the storage devices, and sixth positional information that is positional information of a storage device which will be used by the user among the storage devices,
wherein the information generation part generates the personalized information on the basis of the personal positional information which is at least one of the first positional information, the second positional information, the third positional information, the fourth positional information, the fifth positional information, and the sixth positional information acquired by the information acquisition part, and
wherein the information generation part generates, as the personalized information, at least one of information, an advertisement, and an incentive regarding at least one of commercial facilities or public facilities present near the personal positional information and events held near the personal positional information.

18. An information generation device comprising:
an information acquisition part configured to acquire personal information of a user who uses a battery module which is detachably attached to an electric power device that uses electric power; and
an information generation part configured to generate personalized information on the basis of the personal information acquired by the information acquisition part, wherein the personalized information is specific for the user,
wherein the information acquisition part acquires attachment counterpart information as the personal information, the attachment counterpart information being at least one of information regarding the electric power device to which the battery module which the user is using is attached and information regarding the electric power device to which the battery module which the user has used was attached, and
wherein the information generation part generates at least one of maintenance information with respect to the electric power device, insurance information with respect to the electric power device, and purchase support information with respect to the electric power device, as the personalized information on the basis of the attachment counterpart information acquired by the information acquisition part.

19. An information generation device comprising:
an information acquisition part configured to acquire personal information of a user who uses a battery module which is detachably attached to an electric power device that uses electric power; and
an information generation part configured to generate personalized information on the basis of the personal information acquired by the information acquisition part, wherein the personalized information is specific for the user,
wherein the information generation part generates game information as the personalized information on the basis of the personal information acquired by the information acquisition part, the game information being at least one of an item, a character, and an event regarding a game provided to an application program of the game according to the personal information.

20. An information generation method, comprising:
acquiring personal information of a user who uses a battery module detachably attached to an electric power device that uses electric power; and
generating personalized information on the basis of the acquired personal information, wherein the personalized information is specific for the user,
wherein the acquiring comprises acquiring personal positional information as the personal information, the personal positional information being at least one of fourth positional information that is positional information of a storage device which the user is using among storage devices configured to store a battery module that is exchangeable with the battery module, fifth positional information that is positional information of a storage device which the user has used among the storage devices, and sixth positional information that is positional information of a storage device which will be used by the user among the storage devices, and wherein the generating comprises generating the personalized information on the basis of the personal positional information which is at least one of the fourth positional information, the fifth positional information, and the sixth positional information acquired during the acquiring.

21. An information generation method, comprising:

acquiring personal information of a user who uses a battery module detachably attached to an electric power device that uses electric power; and generating personalized information on the basis of the acquired personal information, wherein the personalized information is specific for the user, wherein the acquiring comprises acquiring personal positional information as the personal information, the personal positional information being at least one of first positional information that is positional information of the battery module which the user is using, second positional information that is positional information of the battery module which the user has used, and third positional information that is predicted positional information of the battery module which will be used by the user, or wherein the acquiring comprises acquiring the personal positional information, the personal positional information being at least one of fourth positional information that is positional information of a storage device which the user is using among storage devices configured to store a battery module that is exchangeable with the battery module, fifth positional information that is positional information of a storage device which the user has used among the storage devices, and sixth positional information that is positional information of a storage device which will be used by the user among the storage devices, wherein the generating comprises generating the personalized information on the basis of the personal positional information which is at least one of the first positional information, the second positional information, the third positional information, the fourth positional information, the fifth positional information, and the sixth positional information acquired during the acquiring, and wherein the generating comprises generating, as the personalized information, at least one of information, an advertisement, and an incentive regarding at least one of commercial facilities or public facilities present near the personal positional information and events held near the personal positional information.

22. An information generation method, comprising:

acquiring personal information of a user who uses a battery module detachably attached to an electric power device that uses electric power; and generating personalized information on the basis of the acquired personal information, wherein the personalized information is specific for the user, wherein the acquiring comprises acquiring attachment counterpart information as the personal information, the attachment counterpart information being at least one of information regarding the electric power device to which the battery module which the user is using is attached and information regarding the electric power device to which the battery module which the user has used was attached, and wherein the generating comprises generating at least one of maintenance information with respect to the electric power device, insurance information with respect to the electric power device, and purchase support information with respect to the electric power device, as the personalized information on the basis of the attachment counterpart information acquired during the acquiring.

23. An information generation method, comprising:

acquiring personal information of a user who uses a battery module detachably attached to an electric power device that uses electric power; and generating personalized information on the basis of the acquired personal information, wherein the personalized information is specific for the user, wherein the generating comprises generating game information as the personalized information on the basis of the personal information acquired during the acquiring, the game information being at least one of an item, a character, and an event regarding a game provided to an application program of the game according to the personal information.

24. A computer-readable non-transitory recording medium in which a program is stored, the program configured to cause a computer to execute:

a step of acquiring personal information of a user who uses a battery module detachably attached to an electric power device that uses electric power; and a step of generating personalized information on the basis of the acquired personal information, wherein the personalized information is specific for the user, wherein the step of acquiring comprises acquiring personal positional information as the personal information, the personal positional information being at least one of fourth positional information that is positional information of a storage device which the user is using among storage devices configured to store a battery module that is exchangeable with the battery module, fifth positional information that is positional information of a storage device which the user has used among the storage devices, and sixth positional information that is positional information of a storage device which will be used by the user among the storage devices, and wherein the step of generating comprises generating the personalized information on the basis of the personal positional information which is at least one of the fourth positional information, the fifth positional information, and the sixth positional information acquired during the step of acquiring.

25. A computer-readable non-transitory recording medium in which a program is stored, the program configured to cause a computer to execute:

a step of acquiring personal information of a user who uses a battery module detachably attached to an electric power device that uses electric power; and a step of generating personalized information on the basis of the acquired personal information, wherein the personalized information is specific for the user, wherein the step of acquiring comprises acquiring personal positional information as the personal information, the personal positional information being at least one of first positional information that is positional information of the battery module which the user is using, second positional information that is positional information of the battery module which the user has used, and third positional information that is predicted positional information of the battery module which will be used by the user, or wherein the step of acquiring comprises acquiring the personal positional information, the personal positional information being at least one of fourth positional information that is positional information of a storage device which the user is using among storage devices configured to store a battery module that is exchangeable with the battery module, fifth positional information that is positional information of a storage device which the user has used among the storage devices, and sixth positional information that is positional information of a storage device which will be used by the user among the storage devices, wherein the step of generating comprises generating the personalized information on the basis of the personal positional information which is at least one of the first positional information, the second positional information, the third positional information, the fourth positional information, the fifth positional information, and the sixth positional information acquired during the step of acquiring, and wherein the generating comprises generating, as the personalized information, at least one of information, an advertisement, and an incentive regarding at least one of commercial facilities or public facilities present near the personal positional information and events held near the personal positional information.

26. A computer-readable non-transitory recording medium in which a program is stored, the program configured to cause a computer to execute:

a step of acquiring personal information of a user who uses a battery module detachably attached to an electric power device that uses electric power; and a step of generating personalized information on the basis of the acquired personal information, wherein the personalized information is specific for the user, wherein the step of acquiring comprises acquiring attachment counterpart information as the personal information, the attachment counterpart information being at least one of information regarding the electric power device to which the battery module which the user is using is attached and information regarding the electric power device to which the battery module which the user has used was attached, and wherein the step of generating comprises generating at least one of maintenance information with respect to the electric power device, insurance information with respect to the electric power device, and purchase support information with respect to the electric power device, as the personalized information on the basis of the attachment counterpart information acquired during the step of acquiring.

27. A computer-readable non-transitory recording medium in which a program is stored, the program configured to cause a computer to execute:

a step of acquiring personal information of a user who uses a battery module detachably attached to an electric power device that uses electric power; and a step of generating personalized information on the basis of the acquired personal information, wherein the personalized information is specific for the user, wherein the step of generating comprises generating game information as the personalized information on the basis of the personal information acquired during the step of acquiring, the game information being at least one of an item, a character, and an event regarding a game provided to an application program of the game according to the personal information.

* * * * *